United States Patent [19]
Cheng et al.

[11] Patent Number: 5,502,759
[45] Date of Patent: Mar. 26, 1996

[54] APPARATUS AND ACCOMPANYING METHODS FOR PREVENTING TOLL FRAUD THROUGH USE OF CENTRALIZED CALLER VOICE VERIFICATION

[75] Inventors: Jane Cheng, Spring Valley Rockland; Edgar Martinez, East White Plains, both of N.Y.; Jayant Naik, Stamford Fairfield, Conn.

[73] Assignee: Nynex Science & Technology, Inc., White Plains, N.Y.

[21] Appl. No.: 61,115

[22] Filed: May 13, 1993

[51] Int. Cl.$^6$ ..................................................... H04M 1/66
[52] U.S. Cl. ............................ 379/88; 379/144; 379/189; 379/201
[58] Field of Search ............................. 379/95, 88, 89, 379/67, 189, 201, 198, 91, 144

[56] References Cited

U.S. PATENT DOCUMENTS

| | | | |
|---|---|---|---|
| 4,757,525 | 7/1988 | Matthews et al. | 379/89 |
| 4,761,807 | 8/1988 | Matthews et al. | 379/198 |
| 4,896,346 | 1/1990 | Belfield et al. | 379/88 |
| 4,935,956 | 6/1990 | Hellwarth et al. | 379/112 |
| 4,961,212 | 10/1990 | Marui et al. | 379/67 |
| 4,979,206 | 12/1990 | Padden et al. | 379/67 |
| 5,003,574 | 3/1991 | Deng et al. | 379/75 |
| 5,054,083 | 10/1991 | Naik et al. | 381/42 |
| 5,073,921 | 12/1991 | Nomura et al. | 379/100 |
| 5,084,816 | 1/1992 | Boese et al. | 395/575 |
| 5,125,022 | 6/1992 | Hunt et al. | 379/88 |
| 5,163,083 | 11/1992 | Dowden et al. | 379/88 |
| 5,163,084 | 11/1992 | Kim et al. | 379/88 |
| 5,164,981 | 11/1992 | Mitchell et al. | 379/88 |
| 5,165,095 | 11/1992 | Borcherding | 379/88 |
| 5,166,971 | 11/1992 | Vollert | 379/88 |
| 5,274,695 | 12/1993 | Green | 379/88 |
| 5,365,574 | 11/1994 | Hunt et al. | 379/189 |

*Primary Examiner*—Ahmad F. Matar
*Attorney, Agent, or Firm*—Peter L. Michaelson

[57] ABSTRACT

An apparatus and accompanying methods for preventing telephone toll fraud that relies on the use of centralized voice verification to authenticate a party claiming a particular identity and requesting service, i.e. access to a telephone network. A voice verification intelligent peripheral (VVIP) (300) is interposed between, e.g., a tandem switch (40) and a voice service node (VSN) (250) both used to provide alternate automated billing service (AABS). The VVIP intercepts all call processing messages that occur between these two components and, at a pre-defined point during the processing of an AABS call, holds a call processing message, specifically a successful line information database (LIDB) query response message, until a voice verification of a caller is complete. While the message is held, the VVIP prompts the caller, who is claiming to be a subscriber, to speak a pre-defined password, obtains a voice template of the resulting speech and attempts to match this template against a template previously stored, within the VVIP, for the subscriber, during a prior enrollment process and for the same password. If the templates match and hence the identity claimed by the caller is confirmed, the VVIP simply passes the message, then being held, onward to its destination, such as the VSN, to then allow the normal processing for this call to proceed and eventually result in the call being extended through public switching network to a dialed destination number.

7 Claims, 21 Drawing Sheets

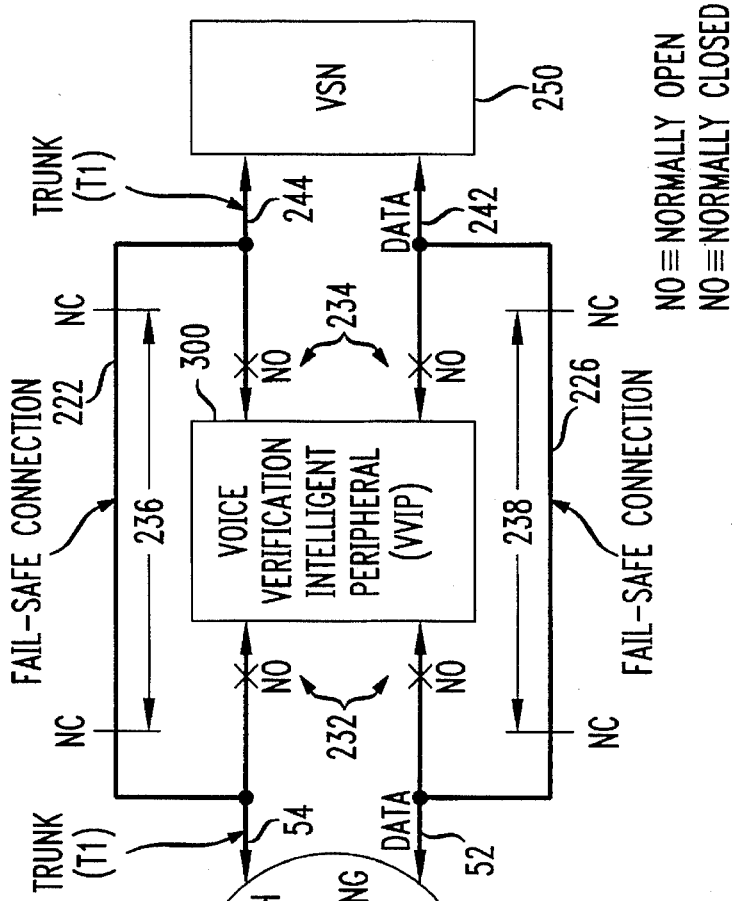
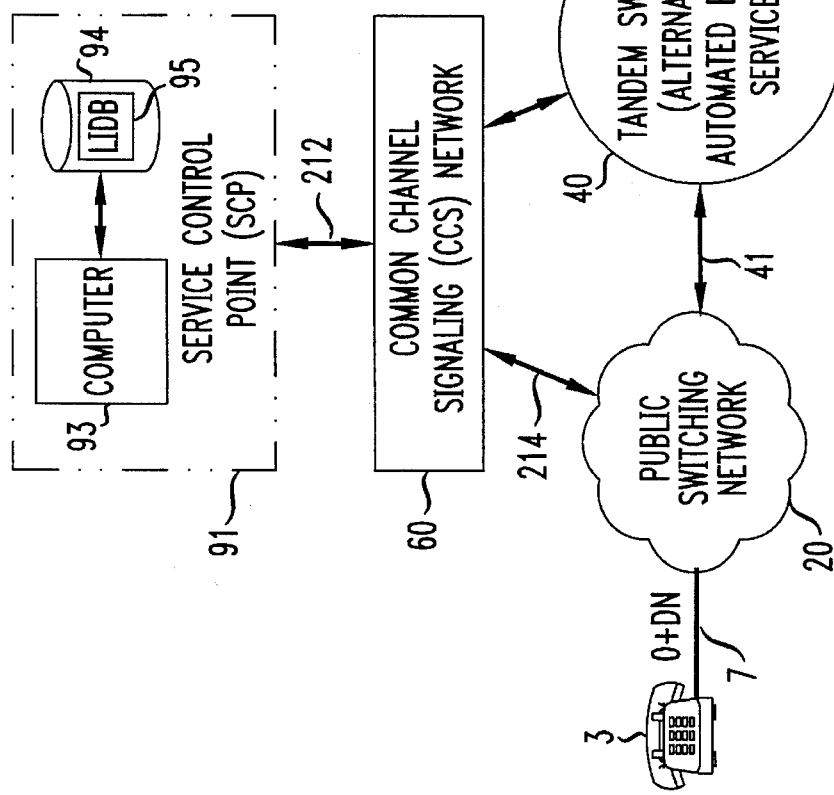
FIG.2

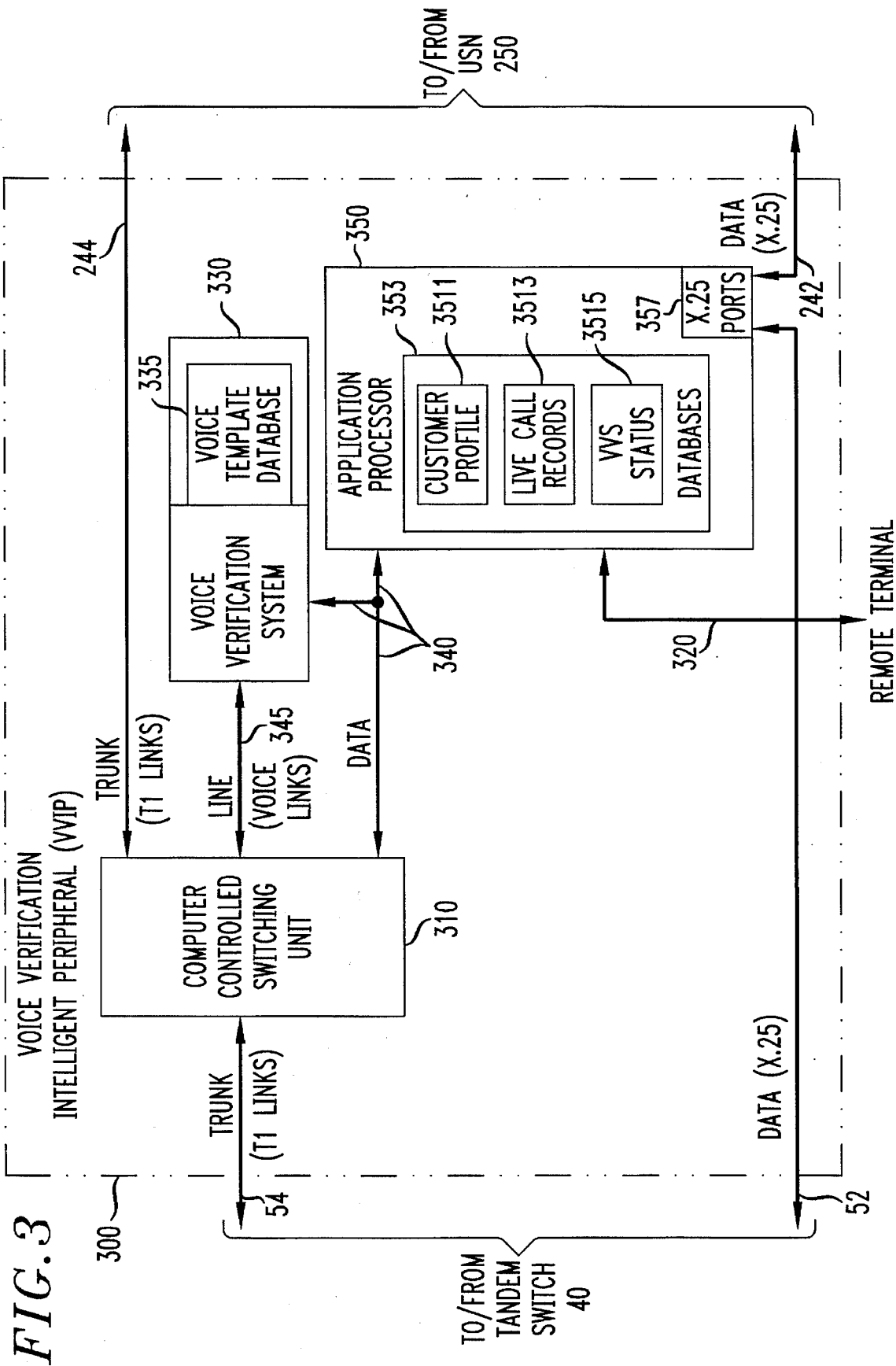

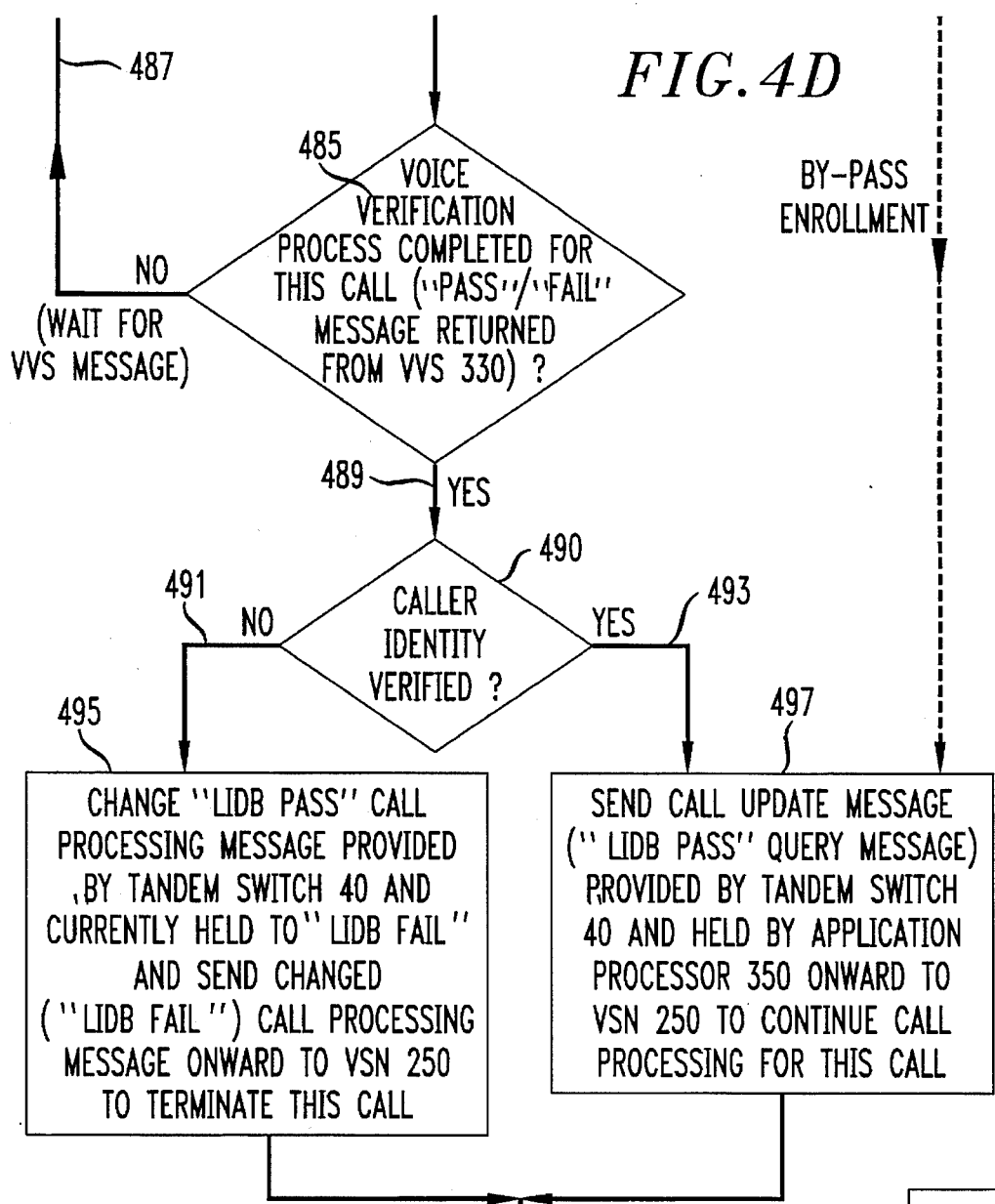

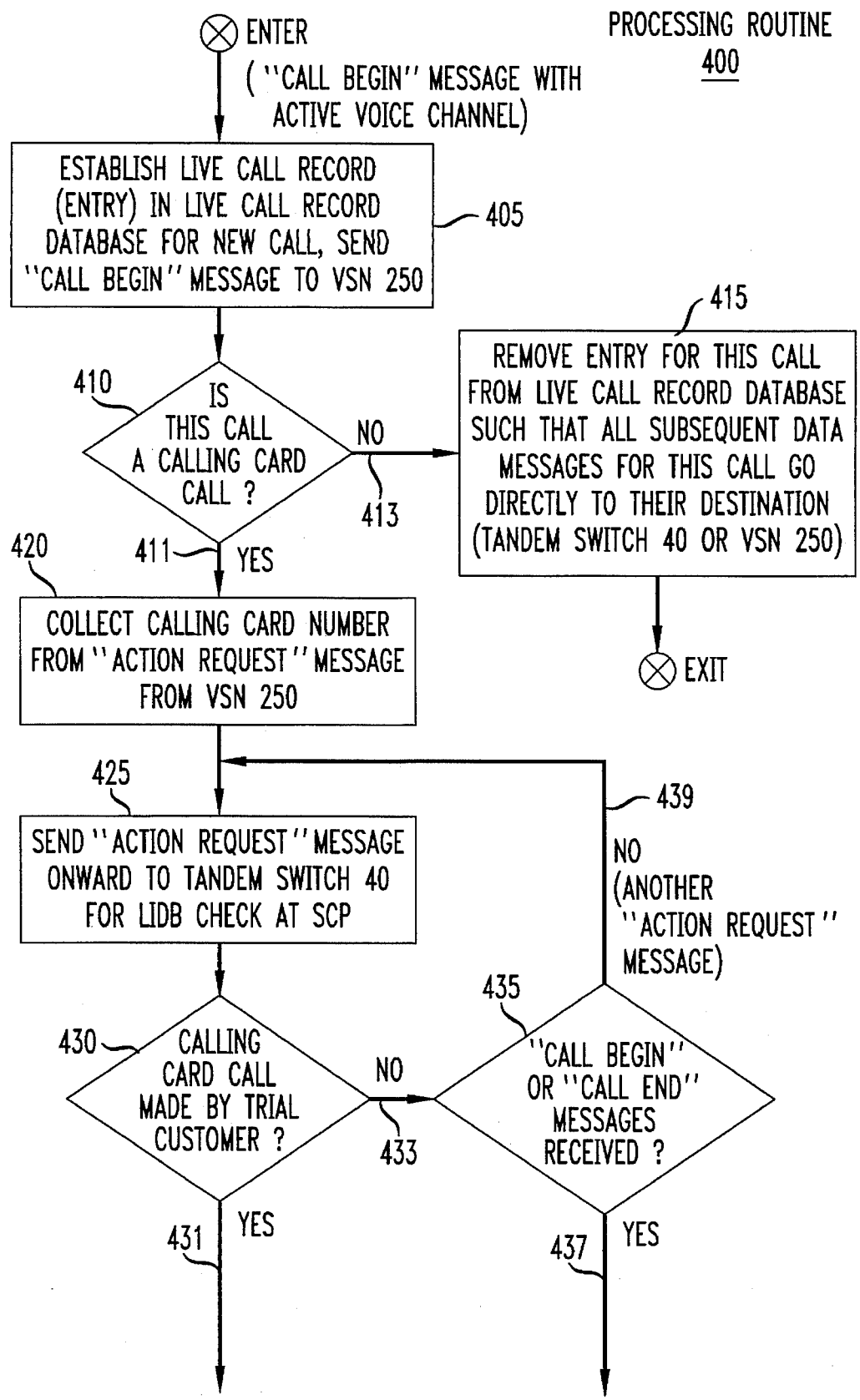

FIG.4C
CALLER VERIFICATION ROUTINE
460

465 — HOLD "LIDB PASS" QUERY RESPONSE MESSAGE WHEN RECEIVED FROM TANDEM SWITCH 40

468 — INSTRUCT SWITCHING UNIT 310 TO ESTABLISH VOICE PATH TO CALLER

470 — FIRST CALLING CARD CALL MADE BY THIS CALLER?

- YES (473) → 475 SEND MESSAGE TO VVS TO INVOKE VVS CALLER FIRST CALLING CARD (ENROLLMENT) ROUTINE 500 IN VVS 330 FOR THIS CALL
- NO (471) → 480 SEND MESSAGE TO VVS TO INVOKE VVS CALLING CARD VOICE VERIFICATION ROUTINE 600 IN VVS 330 FOR THIS CALL

477

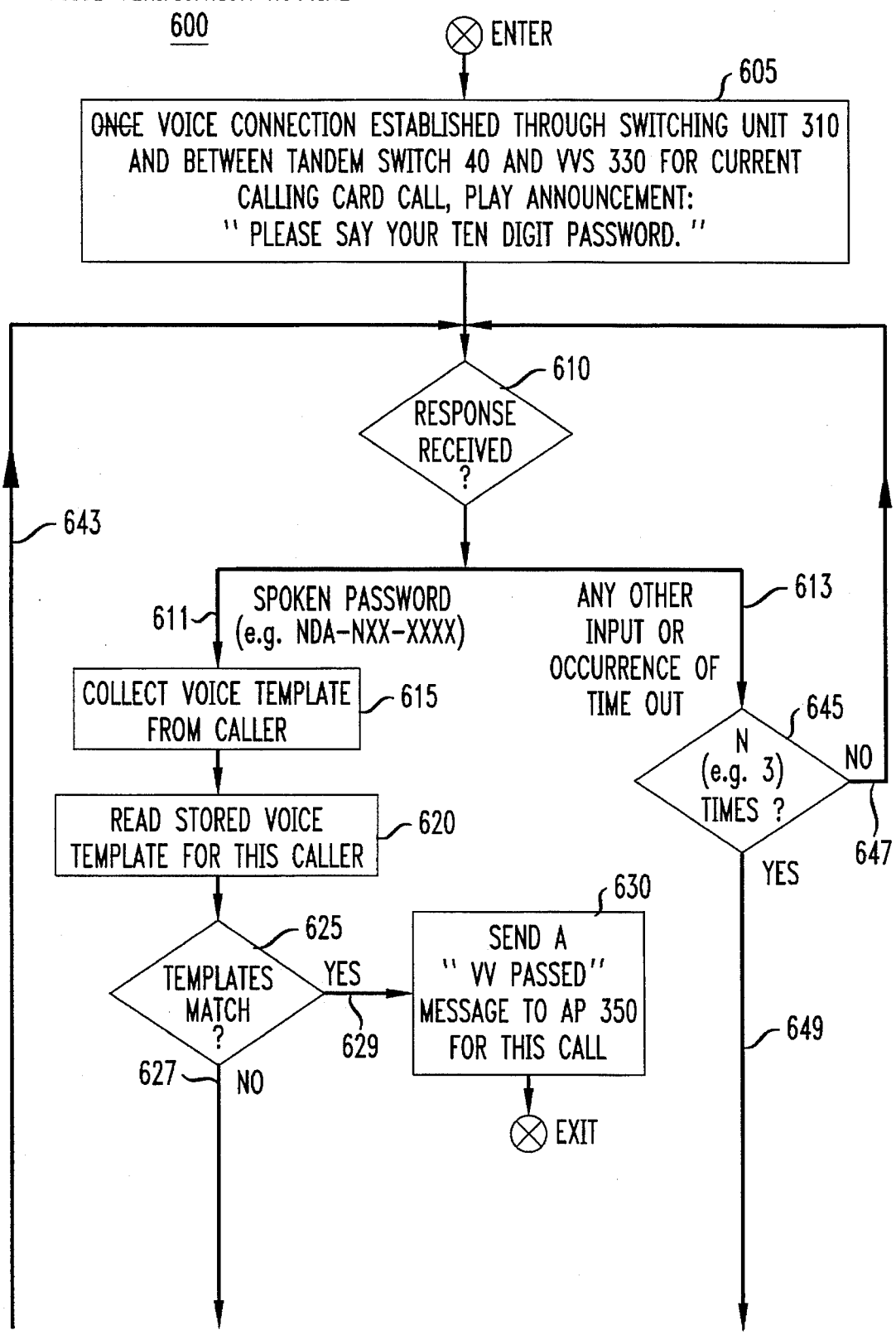

FIG. 7

**STATE TABLE FOR SWITCHING UNIT 310
(INCOMING TRUNKS FROM TANDEM SWITCH 40)**

700

| STATE | EVENT | ACTION | NEXT STATE |
|---|---|---|---|
| TRUNK ON-HOOK (R0) | DETECT OFF-HOOK FROM THE TANDEM SWITCH | PROPAGATE THE OFF-HOOK SIGNAL | OFF-HOOK (R1) |
| TRUNK OFF-HOOK (R1) | DETECT ON-HOOK FROM THE TANDEM SWITCH | PROPAGATE THE ON-HOOK SIGNAL | ON-HOOK (R0) |

FIG. 8

**STATE TABLE FOR SWITCHING UNIT 310
(OUTGOING TRUNKS TO VSN 250)**

800

| STATE | EVENT | ACTION | NEXT STATE |
|---|---|---|---|
| ON-HOOK (R0) | DETECT OFF-HOOK FROM THE VSN | PROPAGATE THE OFF-HOOK SIGNAL | OFF-HOOK (R1) |
| | DETECT CONNECT-VVS MESSAGE FROM THE AP | PLACE THE VOICE CHANNEL TO THE VSN ON HOLD, CONNECT THE VOICE CHANNEL FROM THE TANDEM SWITCH TO THE LINE CONNECTED TO THE VVS | ON-HOOK (R0) |
| | DETECT DISCONNECT-VVS MESSAGE FROM THE AP | DISCONNECT THE INCOMING TANDEM SWITCH VOICE CHANNEL FROM THE LINE. RECONNECT THE VOICE CHANNELS BETWEEN THE TANDEM SWITCH AND THE VSN | |
| OFF-HOOK (R1) | DETECT ON-HOOK FROM THE VSN | PROPAGATE THE ON-HOOK SIGNAL | ON-HOOK (R0) |

FIG. 9 STATE TABLE FOR APPLICATION PROCESSOR 350 FOR A VOICE CHANNEL OR A CALL ID MESSAGE 900

| STATE | EVENT | ACTION | NEXT STATE |
|---|---|---|---|
| WAIT FOR A CALL BEGIN (A0) OR ANY OTHER STATE | RECEIVE A CALL BEGIN WITH AN ACTIVE VOICE CHANNEL | • IF SO ENTRY IN THE LIVE CALL RECORD EXISTS WITH THE SAME CALL ID AND/OR VOICE CHANNEL ID: MAKE AN ENTRY WITH THE FOLLOWING INFORMATION: CALL ID, VOICE CHANNEL ID, CALLED NUMBER, CALLING NUMBER<br>• IF AN ENTRY IN THE LIVE CALL RECORD EXISTS WITH THE SAME CALL ID AND/OR VOICE CHANNEL ID: REMOVE THE EXISTING ENTRY, MAKE A NEW ENTRY WITH THE FOLLOWING INFORMATION: CALL ID, VOICE CHANNEL ID, CALLED NUMBER, CALLING NUMBER | WAIT FOR ACTION REQUEST (A1) |
| WAIT FOR AN ACTION REQUEST (A1) | RECEIVE AN ACTION REQUEST WITH A VALIDATION ACTID | IF THE CALL ID IS IN THE LIVE CALL RECORD AND IF THE CALL IS A CALLING CARD CALL MADE BY A TRIAL CUSTOMER SEND THE MESSAGE OUT AND GET READY TO INVOKE VV | WAIT FOR CALL UPDATE (A2) |
| | | IF THE CALL IS A NON-TRIAL CUSTOMER'S CALLING CARD, SEND THE MESSAGE OUT | WAIT FOR AN ACTION REQUEST (A1) |
| | | IF THE CALL IS NOT A CALLING CARD CALL, REMOVE THE ENTRY FOR THAT CALL ID, SEND THE MESSAGE OUT | WAIT FOR A CALL BEGIN (A0) |
| | RECEIVE AN ACTION REQUEST WITH ANY OTHER ACTID | REMOVE THE ENTRY FOR THAT CALL ID FROM THE LIVE CALL RECORD IF IT IS IN THE RECORD, AND SEND THE MESSAGE OUT | WAIT FOR A CALL BEGIN (A0) |
| | RECEIVE A CALL END MESSAGE | REMOVE THE ENTRY FOR THAT CALL ID FROM THE LIVE CALL RECORD IF IT IS IN THE RECORD, AND SEND THE MESSAGE OUT | |
| | RECEIVE ANY OTHER MESSAGE FROM THE TANDEM SWITCH OR THE VSN | SEND THE MESSAGE OUT | WAIT FOR AN ACTION REQUEST (A1) |
| WAIT FOR CALL UPDATE (A2) | RECEIVE A CALL UPDATE WITH A VALIDATION RESULT DID | IF THE LIDB CHECK PASSED AND A VVS IS AVAILABLE HOLD THE CALL UPDATE MESSAGE AND INVOKE VV: SEND START-VV MESSAGE TO THE VVS, SEND CONNECT-VVS TO THE SU | WAIT FOR VV RESULT (A3) |
| | | IF LIDB CHECK PASSED AND SO VVS IS AVAILABLE-SEND OUT THE CALL UPDATE MESSAGE | WAIT FOR AN ACTION REQUEST (A1) |
| | RECEIVE A CALL END MESSAGE | REMOVE THE ENTRY FOR THAT CALL ID FROM THE LIVE CALL RECORD IF IT IS IN THE RECORD, AND SEND THE MESSAGE OUT | WAIT FOR A CALL BEGIN (A0) |
| | RECEIVE ANY OTHER MESSAGE FROM THE TANDEM SWITCH OR THE VSN | SEND THE MESSAGE OUT | WAIT FOR CALL UPDATE (A2) |
| WAIT FOR VV RESULT (A3) | RECEIVE AN END-VV MESSAGE | COLLECT DATA FOR THIS SESSION, SEND A DISCONNECT-VVS MESSAGE TO THE SU, SEND OUT THE CALL UPDATE MESSAGE TO THE VSN | WAIT FOR CALL END (A4) |
| | RECEIVE A CALL END MESSAGE | SEND AN ABORT-VV MESSAGE TO THE VVS, SEND A DISCONNECT-VVS TO THE SU, REMOVE THE ENTRY FROM THE LIVE CALL RECORD | WAIT FOR CALL BEGIN (A0) |
| | RECEIVE ANY OTHER MESSAGE FROM THE TANDEM SWITCH OR THE VSN | HOLD THE MESSAGE UNTIL AN END-VV IS RECEIVED, THEN SEND OUT THE MESSAGE | WAIT FOR CALL END (A4) |
| WAIT FOR CALL END (A4) | RECEIVE A CALL END | REMOVE THE ENTRY FROM THE LIVE CALL RECORD, SEND THE MESSAGE OUT | WAIT FOR CALL BEGIN (A0) |

FIG. 10

STATE TABLE FOR VOICE VERIFICATION
SYSTEM (VVS) 330

| STATE | EVENT | ACTION | NEXT STATE |
|---|---|---|---|
| VVS IDLE (V0) | RECEIVE A START-VV MESSAGE FROM THE AP | WAIT FOR N SECONDS AND THEN START TO PLAY ANNOUNCEMENTS | VVS BUSY (V1) |
| | RECEIVE A SEND-TONE MESSAGE FROM THE AP | SEND A TONE TO THE SU | VVS IDLE (V0) |
| | DETECT ERROR CONDITIONS IN THE VVS | SEND A VV-STATUS MESSAGE TO THE AP | VVS OUT-OF-SERVICE |
| VVS BUSY (V1) | VV IS COMPLETED | SEND A END-VV MESSAGE TO THE AP | VVS IDLE (V0) |
| VVS OUT-OF-SERVICE | ERROR CONDITIONS RECOVERED | SEND A VV-STATUS MESSAGE TO THE AP | VVS IDLE (V0) |

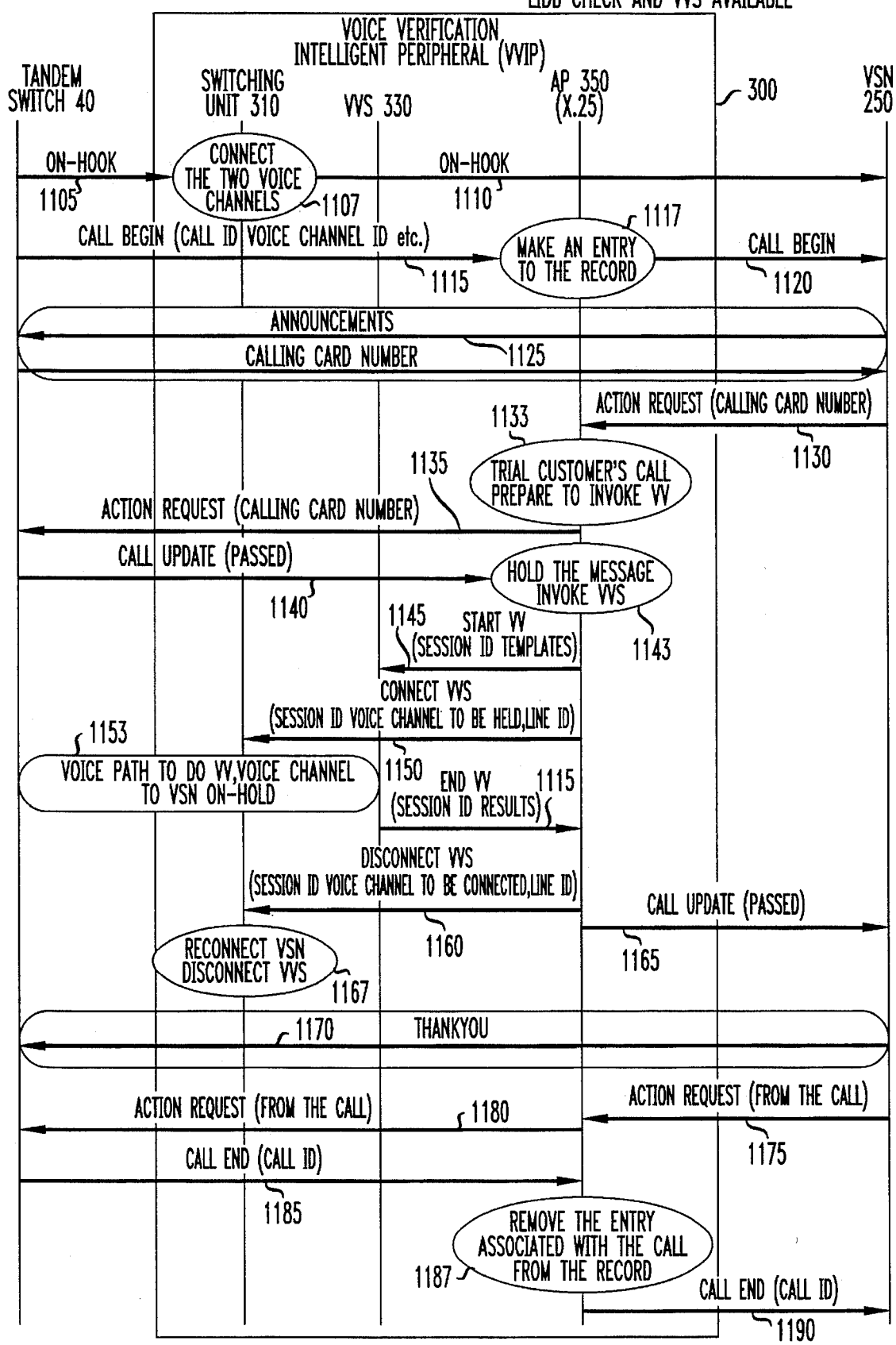

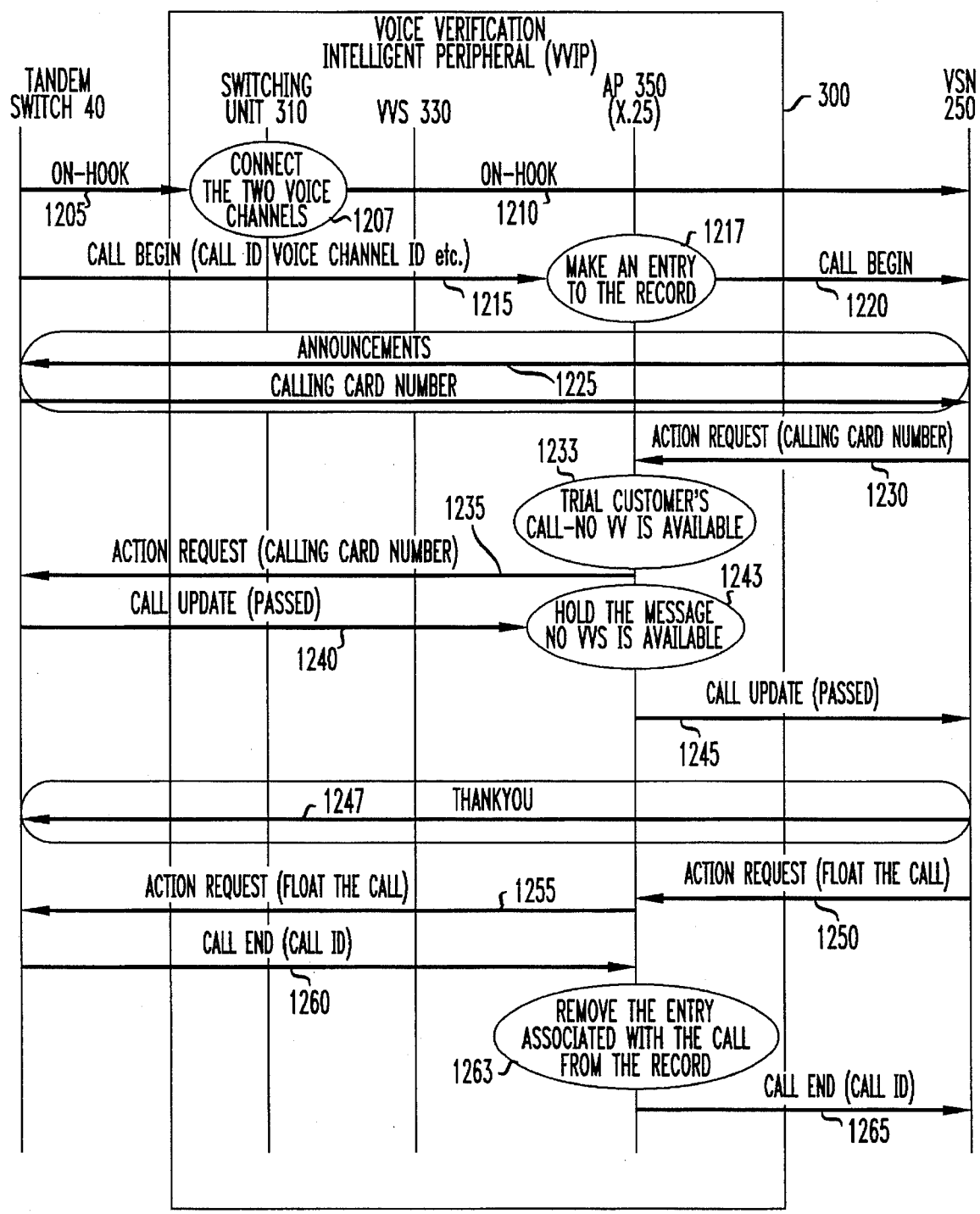

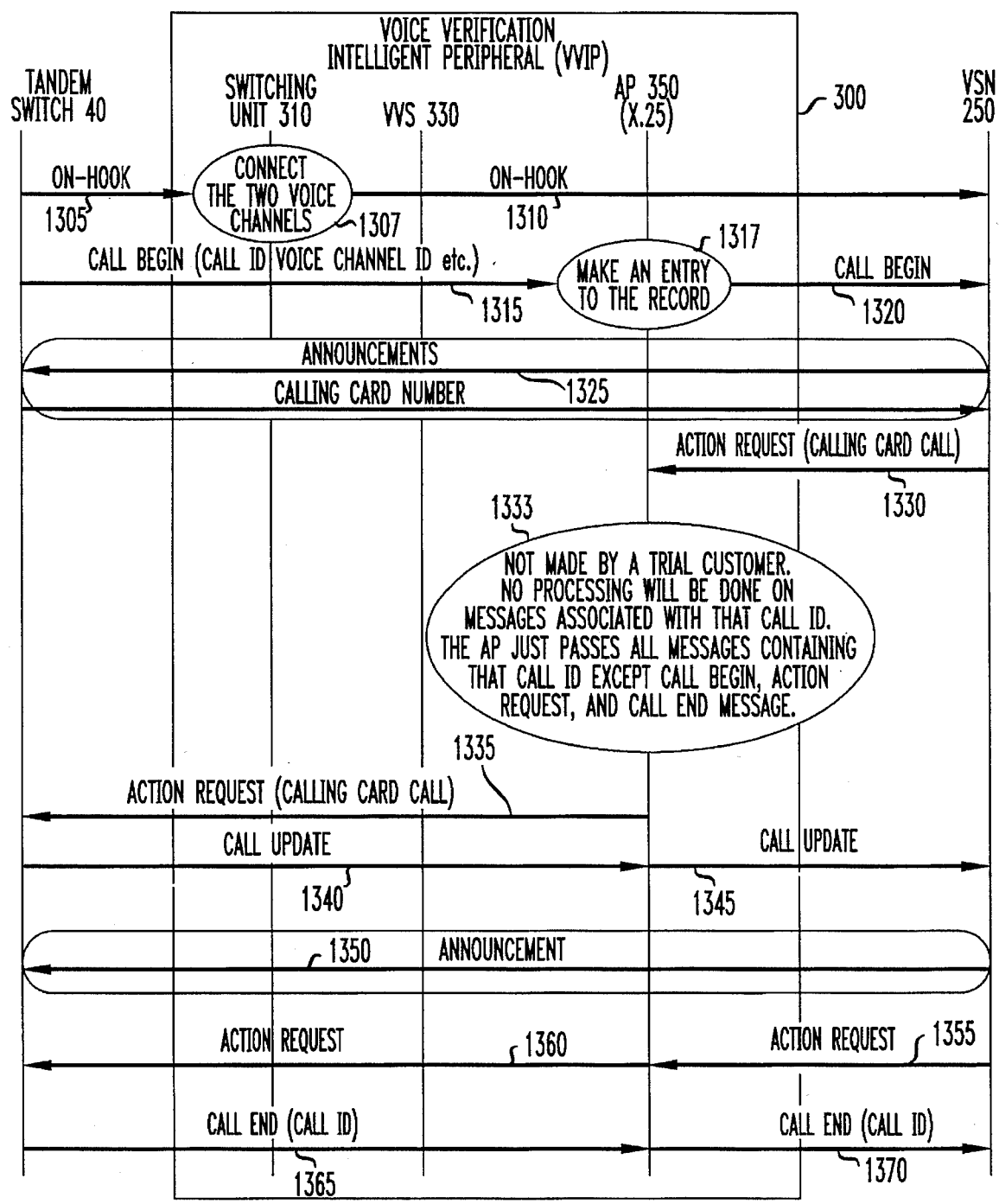

INTER-UNIT COMMUNICATION FOR
NON-CALLING CARD CALLS

SPEECH TEMPLATES CO-LOCATED WITH SPEAKER VERIFICATION PERIPHERAL 1500

SPEECH TEMPLATES CO-LOCATED WITH LIDB
1700

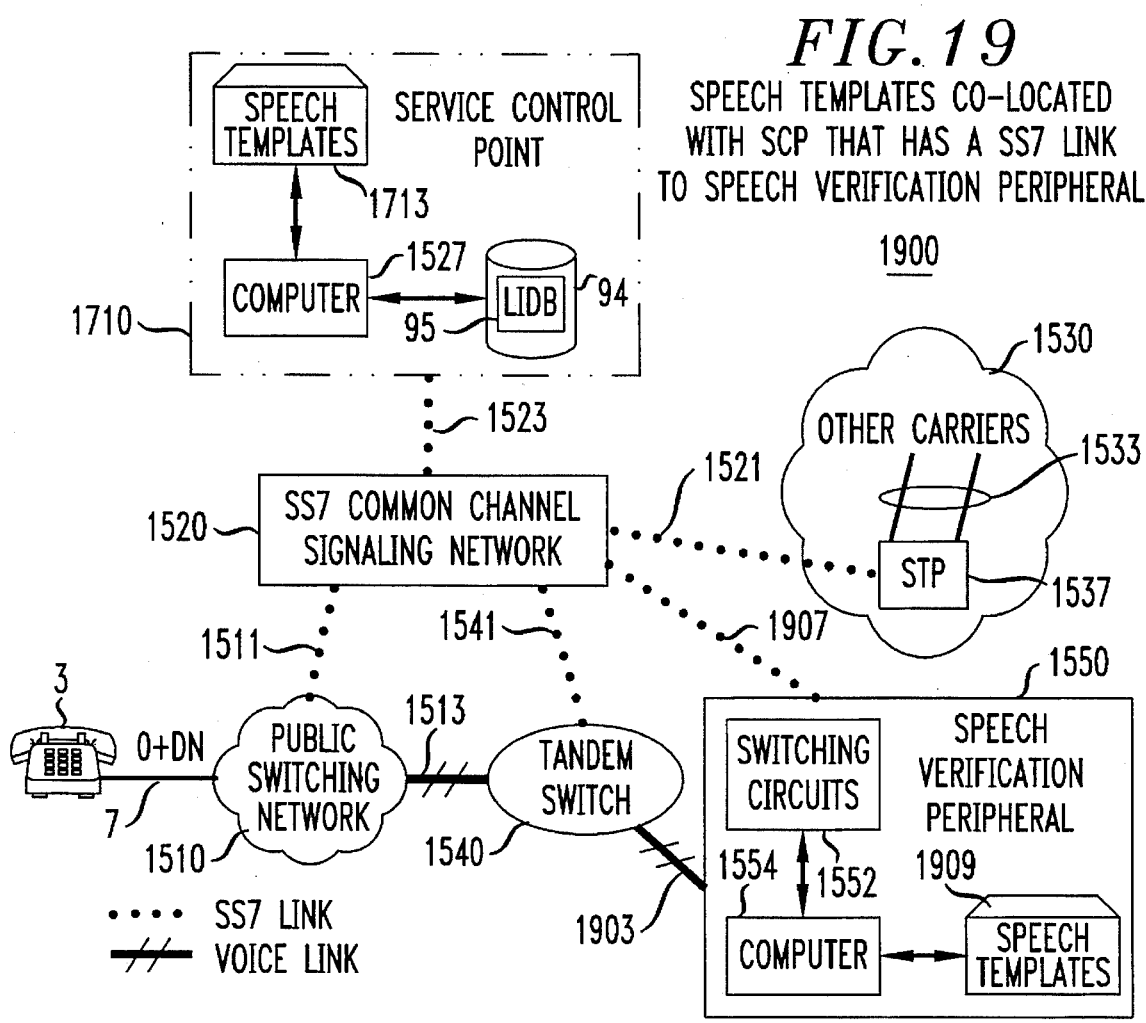
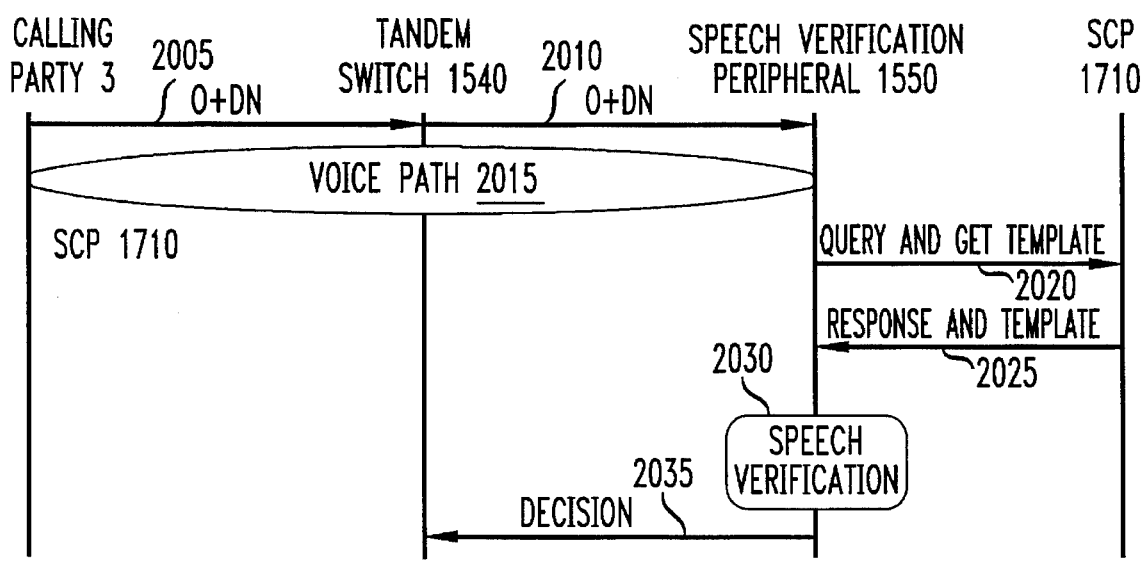

APPARATUS AND ACCOMPANYING METHODS FOR PREVENTING TOLL FRAUD THROUGH USE OF CENTRALIZED CALLER VOICE VERIFICATION

BACKGROUND OF THE DISCLOSURE

1. Field of the Invention

The invention relates to apparatus and accompanying methods for, illustratively, preventing telephone toll fraud and which rely on the use of centralized voice verification to authenticate a party claiming a particular identity and requesting service, i.e. access to a telephone network, from a service provider, e.g. a local or long distance telephone company.

2. Description of the Prior Art

Over the past few years, telephone toll fraud has become a significant and growing problem to telephone service providers (both local and long distance carriers), telephone equipment owners and manufacturers, and both individual and business telephone service subscribers. Currently, annual losses to business and individual subscribers arising from this fraud are estimated to reach approximately $3 Billion.

In general, toll fraud involves the theft of network access by an unauthorized caller. This fraud occurs when a caller gains unauthorized access to dial tone associated with service charged to a legitimate subscriber. As a result, once that caller receives dial tone, that caller subsequently places one and frequently many telephone calls, typically anywhere throughout the telephone network, with the ensuing telephone charges ultimately being billed to the subscriber. Given the monthly billing mechanisms used with nearly all telephone carriers, these charges are billed generally several weeks after the fraudulent calls are made, thereby frustrating attempts at preventing the fraud from occurring in the first instance.

Calling card fraud is a particularly pernicious and widespread variety of toll fraud which, owing to the magnitude of the theft of service involved, has become essential to eliminate.

Currently, to place a calling card call, a caller need only dial a destination number preceded by "0+", and then following a "bong" tone, enter a calling card number, which itself includes an account number to which the call is to be billed followed by a personal identification number ("PIN"). The account number, for a local Bell operating company ("BOC"), is generally a ten-digit telephone number of the subscriber, complete with area code. In this instance, the PIN is a four-digit number assigned by the BOC to that subscriber. Immediately after the calling card number including the PIN is entered, that number is validated. In doing so, a local equal access switch which is then servicing that caller launches a query message through a common channel signaling network to a service control point ("SCP") appropriate to the entered calling card number. A database of calling card numbers is then accessed to determine whether the entered number is designated to be valid or not. Each carrier, whether a long distance or local carrier, typically maintains one or more service control points with corresponding internal databases of calling card numbers issued by that carrier along with the status of each such number. If the calling card number is valid, the SCP sends a response message back through the signaling network to the local switch. The switch, in turn, simply routes the call dialed by the subscriber onward through the network to the destination number.

In calling card fraud, a caller, totally unbeknownst to a subscriber, obtains a calling card number of that subscriber and then simply places a calling card call charged to that calling card number. The subscriber does not realize the fraud has occurred until he or she receives a subsequent bill for service. One way a caller obtains the number is to simply watch public telephones as subscribers punch in their numbers and then note each entered calling card number as it is entered. Alternatively, a caller may station himself close to a subscriber and simply eavesdrop of a conversation, during which that subscriber provides his or her calling card number to a telephone operator, and record the spoken number. Fraudulent callers may also use a variety of scams to call unsuspecting subscribers and, through a ruse, deceive them into revealing their calling card numbers. Now, regardless of the particular technique used to gain a calling card number, once a caller enters a valid calling card number, that caller is then granted access to call anywhere throughout the entire worldwide telephone network. Consequently, as presently constituted, the telephone network simply completes the call, with concomitant charges billed therefor, before its fraudulent nature is discovered. Although individuals are liable for a relatively small amount of illicit calling card telephone charges, typically $50, no such limit exists for business and other users. Nevertheless, given the sheer and growing magnitude of the losses currently flowing from toll and particularly calling card fraud, telephone carriers are increasingly turning their attention to develop ways to limit and preferably eliminate this (as well as other) fraud from occurring.

One such technique aimed at reducing calling card fraud involves real-time analysis of calling patterns to detect abnormally high usage numbers and blockage of further calls billed to any such number. In that regard, once a calling card number is fraudulently obtained, that number is often quickly disseminated to quite a few callers and, to allude detection, heavily used by all of them over a relatively short interval of time, such as a few days, before a new number is fraudulently obtained, disseminated, used and so on. Thus, calling card fraud often manifests itself as a concentrated burst of grossly excessive usage above a normal calling pattern. Thus, with this technique, a fixed, or statistically varying, threshold might be established for each subscriber based upon his or her recent actual calling pattern. As each calling card call is made to a calling card number, then, during calling card validation, the current frequency of calls billed to this number is measured and compared to a corresponding threshold by an SCP. Once the threshold is met or exceeded, the SCP denies access to all subsequent calls billed to that number until the calling frequency decreases below the threshold. While, at first blush, this technique may seem to afford adequate protection, it suffers from a number of drawbacks which severely limit its attractiveness. First, while this technique can reduce the total number of fraudulent calls billed to a given calling card number, this technique will not completely eliminate these calls and the cost associated therewith. In fact, in order for this technique to detect fraud, a relatively large number of fraudulent calls must occur in order to appreciably raise the calling frequency to the threshold. The cost of these calls must still be absorbed either by the subscriber and/or the carrier(s) involved. Second, this technique does not discriminate among callers. Once the threshold is met or exceeded for a calling card number, network access is denied to anyone subsequently entering that number. Hence, the true owner of that number would be denied access just as would any fraudulent caller. Inasmuch as calling card fraud occurs without knowledge of the true owner, once the fraud is detected, the true owner is denied service and, as a result, greatly inconvenienced.

In an effort to mitigate service denials and the ensuing inconvenience to valid subscribers, other techniques that ostensibly discriminate amongst individual callers have proposed to counter calling call fraud. These techniques rely on independently and uniquely verifying the identity claimed by the caller apart from verifying the calling card number. The intent in doing so is to allow a call from a true owner of a calling card number, i.e. a valid subscriber, to be routed while blocking calls from others that have fraudulently gained access to that number. With respect to the general field of access control, various approaches have been proposed which rely on identifying individuals through highly unique biometric characteristics, such as eye retinal patterns, fingerprints and human voice characteristics. Given the nature of the telephone network, the only practical biometric characteristic is voice. Fortunately and statistically speaking, a single human voice is highly unique amongst a very large universe of individuals.

In this regard, U.S. Pat. No. 5,125,022 (issued on Jun. 23, 1992 to A. K. Hunt et al—the '022 patent) describes a technique for authenticating a caller through voice verification, and specifically for authenticating callers who are placing verbal orders through a telephonic order entry service or a telephonically accessed financial service. Here, voice verification circuitry is completely resident at a line end of the network and specifically within equipment at a service provider site. This technique relies on comparing a password just spoken by a party claiming to be a specific caller against the same password previously spoken by that caller and stored for subsequent use. If a match occurs, at least to within a sufficient accuracy, then the party is verified to be the caller and is granted access to the desired service. Inasmuch as this technique is simply line-to-line based, the telephone network itself is totally transparent to the use of voice verification. However, to efficiently prevent calling card fraud, voice verification would need to be embedded within the telephone network itself, i.e. on the trunk rather than the line side of the network, and particularly in a cost-effective manner that is readily compatible with existing telephone switching equipment as well as engender only minimal, if any, inconvenience to callers. The '022 patent simply fails to teach how voice verification could be accomplished in this manner within the telephone network itself.

In view of the deficiencies in the '022 patent, one voice based caller identification technique, that might be used within the telephone network itself, relies on incorporating a voice template of a caller into a magnetic strip affixed to the rear of a calling card. During the course of "swiping" the card past a suitable reader in a telephone, the telephone would read the voice template of the caller. Thereafter, suitable speech synthesis and recognition/verification equipment situated within the network would ask the caller to speak the word(s) or number(s) recorded in the template, and finally confirm or reject the caller, and hence signal the local switch to grant or deny network access, based upon whether the spoken speech matches, within a suitable accuracy, that previously stored in the template. Unfortunately, if the calling card is lost or stolen, then its true owner is forced to re-enroll and store a new voice template on a replacement card. This imposes an added burden, which is quite inconvenient, on the owner. Furthermore, since enrollment is not supervised, a party who illicitly gains possession the card could, if properly equipped, simply record his or her own voice template on the card and thereby fraudulently gain network access until the fraud was discovered some time later. Alternatively, a subscriber could be issued a so-called "Smart card" which incorporated an internal microcomputer to store voice data, and particularly in encrypted form, and/or perform all or a portion of the voice analysis. Unfortunately, this technique is extremely impractical as it would only function with those telephones that can interface to these particular cards. Hence these techniques will not function, at all, with the vast base of telephones already in service, none of which possess the requisite capabilities.

Thusfar, in spite of the tremendous cost savings that would flow from implementing a caller verification technique that effectively eliminates toll fraud in the telephone network and the uniqueness inherent in the human voice and hence the appeal of using a voice based verification technique, the art has failed to teach a practical implementation of this technique for use in the telephone network.

Consequently, a need still exists in the art for a technique, specifically apparatus and accompanying methods, for incorporation into a telephone network that, through voice verification, can independently verify an identity of a caller. To be practical while still providing sufficient security and caller convenience but with minimal inconvenience to callers, this technique should not rely on storing voice data on a calling card and, importantly, should be compatible with all telephones currently in service. Furthermore, this technique should be cost-effective and readily compatible with existing switching equipment currently used within the telephone network itself.

SUMMARY OF THE INVENTION

Our present invention advantageously prevents toll, illustratively calling card, fraud by incorporating caller based voice verification into a telephone network in a manner that substantially, if not completely, eliminates the deficiencies inherent in the art.

In accordance with one embodiment of our broad inventive teachings, we centralize the voice templates, in e.g., our inventive voice verification intelligent peripheral, and interpose the voice verification intelligent peripheral (VVIP) between, e.g., a tandem switch and a voice service node (VSN) both used to provide alternate automated billing service (AABS). The VVIP intercepts all call processing messages that occur between these two components and, at a pre-defined point during the processing of an AABS call that requires voice verification such as a calling card call, merely holds a call processing message until voice verification is complete. Other messages are merely relayed, typically upon receipt, through the VVIP between the tandem switch to the VSN. The message being held is typically a successful query response message that originates from an SCP and confirms the validity of a calling card number dialed by the caller. Holding this message simply suspends normal call processing. While the message is held, the VVIP prompts the caller to speak a pre-defined password, obtains a voice template of the resulting speech and attempts to match this template against a template previously stored for this caller, during a prior enrollment process, for the same password. If the templates match and hence the identity claimed by the caller is confirmed, the VVIP simply passes the message, then being held, onward to its destination, such as the VSN, to then allow the normal processing for this call to proceed and eventually result in the call being extended through public switching network to a dialed destination number. Alternatively, if voice verification fails, the VVIP changes the message then being held to indicate that the calling card number is invalid and then passes the changed message onward to block the call from being routed. As such, voice verification is performed in a manner that is substantially, if not totally transparent, to the network and without requiring any change to any of the existing network components.

Our inventive VVIP contains a voice verification system (VVS) that performs template matching, a computer controlled switching unit that establishes a voice path between the VVS and the caller through a voice channel provided by the tandem switch, and an application processor that controls both the switching unit and the VVS. Upon a first calling card call made by a subscriber, the VVS enrolls that subscriber by first prompting that subscriber to speak a password (typically, but not limited to, a ten-digit number) and second, storing a resulting voice template for that subscriber. For each subsequent calling card call to be billed to the calling card of the subscriber, the VVS prompts the caller to again speak his or her password and then determines whether the latest template matches, within a suitable accuracy, a previously stored template for that subscriber.

Since template matching occurs after a caller has had his or her calling card number validated by accessing an appropriate line information database (LIDB) at a service control point (SCP), the identity claimed by the caller, as perceived by the network and specified by the calling card number, is independently verified, in a caller specific manner, totally apart from the number itself. Should the verification fail, the network is simply instructed by the VVIP not to complete the call regardless of the actual validity of the calling card number.

Inasmuch as the call processing messages are only somewhat delayed but not altered in any fashion by the VVIP, inclusion of voice verification into the network through use of the VVIP substantially, and usually totally, eliminates the need to change any of the programming within any network component, e.g. any tandem switches, the VSN or any SCP, or the hardware associated therewith. Thus, our inventive VVIP is fully compatible with existing digital telephone networks that provide automated alternate billing services and is readily and easily installed therein. Moreover, by advantageously siting voice verification templates entirely within the network, our inventive architecture eliminates the need to encode any voice data on either a calling card or other media carried by any caller as well as the need to employ special purpose telephones. As such, our inventive voice verification techniques can advantageously function with nearly any, if not all, telephones presently in service.

Furthermore, in accordance with a feature of our invention, our invention can also be readily embodied within a signaling system 7 (SS7) network wherein a voice template database can be stored not only centrally, within a so-called speech (voice) verification peripheral (SVP) associated with and to provide local access to a single tandem switch, but also remotely and centrally at an SCP. Situating the database within an SCP presents the advantage of permitting widespread centralized geographic access, through the SS7 network, to voice templates without undue equipment and data duplication and hence excessive cost. In this manner, a requesting SVP can readily access a voice template stored at any SCP and/or SVP, to which the requesting SVP can communicate through the SS7 common channel signaling network, essentially regardless of the current location of the caller.

BRIEF DESCRIPTION OF THE DRAWINGS

The teachings of the present invention can be readily understood by considering the following detailed description in conjunction with the accompanying drawings, in which:

FIG. 2 depicts first network embodiment 200 of our present invention for performing voice verification, on a centralized tandem office basis, for calling card calls;

FIG. 3 depicts a block diagram of voice verification intelligent peripheral (VVIP) 300 shown in FIG. 2;

FIG. 4 depicts the correct alignment of the drawing sheets for FIGS. 4A–4D;

FIGS. 4A–4D collectively depict a high level flowchart of AP Call Processing routine 400 that is separately executed within application processor 350 shown in FIG. 3 to process each calling card call;

FIG. 5 depicts the correct alignment of the drawing sheets for FIGS. 5A and 5B;

FIGS. 6A and 6B collectively depict a high level flowchart of VVS Caller Calling Card Voice Verification routine 600 that is also executed within voice verification system 330 shown in FIG. 3;

FIG. 7 depicts state table 700 for switching unit 310, shown in FIG. 6, and for call data messages arriving on incoming trunks from tandem switch 40;

FIG. 8 depicts state table 800 for switching unit 310, shown in FIG. 6, and for call data messages on outgoing trunks to voice service node 250;

FIG. 9 depicts state table 900 for application processor (AP) 350, shown in FIG. 3, for a voice channel or a call identification (CALL ID) message;

FIG. 10 depicts state table 1000 for voice verification system (VVS) 330 also shown in FIG. 3;

FIG. 11 depicts, at a high level, a protocol diagram of inter-unit communication, that occurs, for system 200 shown in FIG. 2 and VVIP 300 shown in FIG. 3, for processing a calling card call when a successful LIDB check has occurred for that call and a voice verification system is available to handle that call;

FIG. 12 depicts, at a high level, a protocol diagram of inter-unit communication that occurs, for system 200 shown in FIG. 2 and VVIP 300 shown in FIG. 3, for processing a calling card call when a successful LIDB check has occurred for that call but a voice verification system is not available then to handle that call;

FIG. 13 depicts, at a high level, a protocol diagram of inter-unit communication that occurs, for system 200 shown in FIG. 2 and VVIP 300 shown in FIG. 3, for processing a calling card call that was not made by a "trial" customer;

FIG. 19 depicts fourth network embodiment 1900 for performing voice verification for calling card calls within an SS7 network where speech templates are located within an SCP and illustratively co-extensively with a LIDB and where the SCP has a SS7 link to a speech verification peripheral; and FIG. 20 depicts, at a high level, inter-unit communication that occurs, for network embodiment 1900 shown in FIG. 19 for processing a calling card call.

To facilitate understanding, identical reference numerals have been used, where possible, to designate identical elements that are common to the figures.

DETAILED DESCRIPTION

After considering the following description, those skilled in the art will clearly realize that the teachings of our invention can be readily utilized in a wide variety of different applications to provide access control by verifying a claim of identity made by a user. By interfacing specialized access control equipment, particular to the application of interest, to a telephone network that incorporates centralized voice verification consistent with our broad inventive teachings and by incorporating suitable queries and responses therebetween, fraudulent access could be substantially reduced, if not completely eliminated, without appreciably inconveniencing a user community. For example, this equipment could regulate access to a computer or to any one of a series of automated teller machines ("ATMs") in an automated banking or credit card terminal network. Of course, our invention is particularly useful for controlling access to a variety of telephone services such as those that rely on using remote database access to provide a telephonic service, e.g. a virtual private network, or even those that do not, such as providing a caller with an outside voice or data line through a private or local exchange. Nevertheless, for the sake of brevity as well as illustration, we will describe our invention in the context of use in preventing calling card fraud in a typical telephone network.

With respect to calling card fraud, we will describe our invention first in terms of a conventional environment through which calling card calls are currently handled and then in the context of various different embodiments of our invention. The first of these embodiments is a centralized architecture for use with a tandem switch and a pre-existing voice service node (VSN) for performing "localized" voice verification, i.e. for calls that are to be completely handled within a given relatively small geographic service area such as that handled by this switch. Advantageously, this embodiment can be quickly and easily incorporated, for, e.g. a "trial" or localized use, into a conventional telephone switching environment that handles calling card calls but without a need to change the programming of any of the switches therein. Thereafter, we will address various differing inventive architectures for use with a signaling system 7 (SS7) network to provide voice verification throughout an entire telephone network and hence over a very wide geographic area.

A. Conventional manner of handling calling card calls

Figure 1:
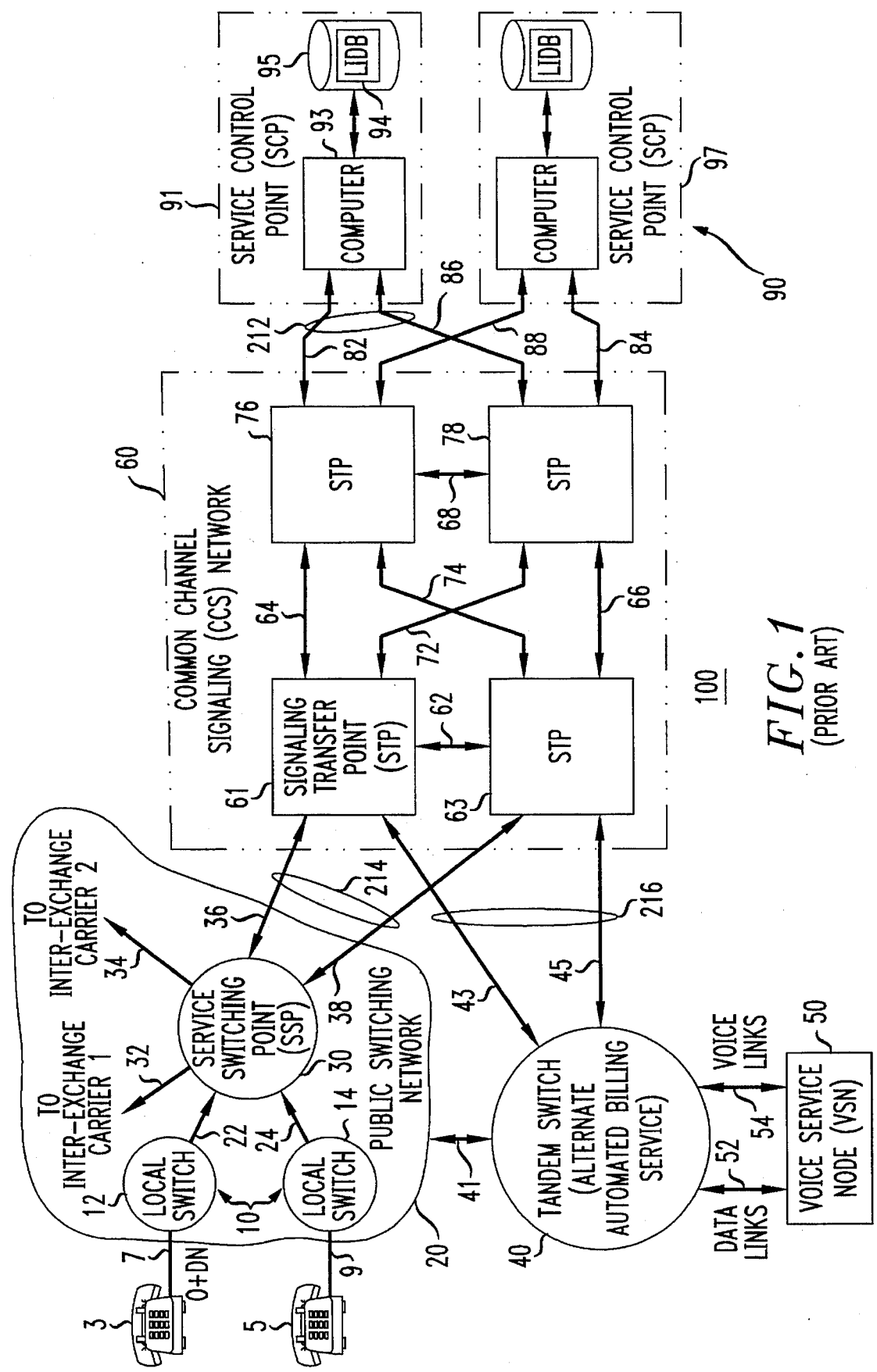
FIG. 1 depicts conventional telephone network 100 for performing alternate automated billing service (AABS) calls, such as calling card calls.

FIG. 1 depicts, in a high level simplified form, conventional telephone network 100 for processing alternate automated billing service (AABS) calls which include collect, bill-to-third party and calling card calls. This processing occurs on a transactional basis. In general, network 100 provides special telephone routing instructions to support these calls. These instructions are obtained through remote call processing, using caller supplied information such as a calling (telephone credit) card number, to appropriately access one or more databases that are embedded within the telephone signaling network.

As shown, network 100 is formed of public switching network 20 which provides network terminations, i.e., line connections for both originating and destination calls, simplistically through telephones 3 and 5, common channel signaling (CCS) network 60, service control points (SCPs) 90 which collectively contain duplicated SCPs 91 and 97, tandem switch 40 and voice service node (VSN) 50. Telephones 3 and 5 are connected through corresponding telephone lines 7 and 9 to local switches 12 and 14 both of which are situated within public switching network 20. This network, as simplistically depicted, contains local switches 12 and 14, respectively connected through trunks 22 and 24, to service switching point (SSP) 30. This switch routes calls, based upon caller selection via trunks 32 and 34, to a desired inter-exchange carrier, such as inter-exchange carrier 1 or inter-exchange carrier 2, respectively. To process signaling messages, such as queries for certain services from SSP 30 and to provide obtain appropriate signaling responses thereto to effectuate proper call routing, network 20, and specifically SSP 30 located therein, is, in turn, connected, through duplicated signaling links 36 and 38, to CCS network 60. In addition, to handle AABS calls which necessitate using voice synthesis and limited voice recognition and to generate and obtain appropriate signaling messages associated with these services, tandem switch 40 is connected through trunks 41 to network 20 and, via signaling links 43 and 45, to CCS network 60. The tandem switch is also connected through data link 52 and voice link 54 to VSN 50. CCS network 60 is itself cross-connected through links 82, 84, 86 and 88 to SCPs 91 and 97. CCS network essentially provides redundant transport of signaling messages between switches and appropriate service control points, wherein the latter, through self-contained databases and processors, appropriately process these messages, i.e. generate responses to appropriate queries. Each of these components is conventional, with specifically tandem switch 40 being illustratively a type DMS 200 digital switch and the voice storage node being illustratively a type "TOPSVL" VSN both available from Northern Telecom, Inc. of Canada.

To provide a firm understanding of AABS and the role played by transactional remote database processing, we will first address how bill-to-third party and collect calls, which typically do not require remote database processing, i.e. do not need intervention by an SCP, could be handled through network 100 and then address how calling card calls, which require such processing, are handled.

Inasmuch as our invention does not lie in any of the specific components shown in FIG. 1 and all of which are conventional and very well known, none of these components will be specifically discussed in any further detail herein.

1. Call handling without SCP intervention—collect and bill-to-third party calls

Assume for the moment that a caller, stationed at telephone 5, desires to make a bill-to-third or collect call to a destination number (DN). To do so, the caller first lifts the handset to obtain dial tone (i.e. establishing an "off-hook" condition). At this point, the caller (not shown) is generally connected to a local switch, such as local switch 12 or 14, and for this example switch 14, which provides dial tone and local network access. Thereafter, the caller dials the destination number preceded by a zero, i.e. "0+DN". This, in turn, initiates AABS for this call. In particular, local switch 14 establishes a voice connection, via trunk 24, through service switching point 30 to tandem switch 40 which handles this service. Tandem switch 40, in turn, connects the caller to a voice path to VSN 50. This voice service node contains appropriate conventional circuitry to play voice announcements to a caller, perform voice recognition on a limited basis such as to collect spoken words and well as to recognize the words "YES" or "NO", record and play spoken caller responses, formulate and transmit call signaling messages based on caller responses and receive and process appropriate call signaling messages received from the network.

In order to process an AABS call, the voice service node first plays an announcement to the caller inquiring how the call is to be billed, e.g. a collect call or a bill-to-third party call. The caller is verbally instructed to enter his or her selection through pressing a corresponding digit on the keypad, such as "11" for a collect call or "12" for a bill-to-third party call. In either case, the VSN then requests the caller to speak his name and records the ensuing spoken response. If the call is a collect call, the VSN fabricates a call processing message to the tandem switch to instruct the tandem switch to dial the destination number, through network 20, and establish a voice path between the destination number and the VSN. Once the call is extended through network 20 to the called party and a voice path is established for the call through the tandem switch to the VSN, the VSN first plays a suitable announcement that informs the called party that he or she has a collect call and then plays the recorded name of the caller. Next, the VSN then plays a voice announcement to the called party which solicits acceptance or denial of the call by verbally signifying a simple "YES" or "NO" answer or manually depressing or dialing a suitable digit key on the telephone keypad. If a voice response is made, the VSN then utilizes speaker independent voice recognition to ascertain whether the called party answered "YES" or "NO". Based upon the result, the VSN suitably informs the tandem switch to inform network 20 to either, in the case of call acceptance, allow the call to continue with billing to the called party or, if the call is denied, simply terminate the call. If the call is accepted, the network tears down the connection then extending to tandem switch 40 and therethrough to the VSN. If the call is denied, all the call connections are then simply torn down.

With respect to bill-to-third party calls, slightly different call processing is used from that applicable to a collect call. In that regard, once the caller signifies his or her intention to make a bill-to-third party call, the VSN plays a suitable announcement that requests the caller to enter, either verbally or through the keypad, the third party number to which the call is to be billed. Once the VSN successfully collects this number, either through voice recognition if the words have been spoken or through well-known dual tone multi-frequency (DTMF) detection if the digits are entered through the keypad, this information is passed to the tandem switch which instructs network 20 to dial the third party number and extend a voice connection to the caller through the tandem and, hence therethrough, to the VSN. Once this call is completed, the VSN plays a suitable voice announcement, to the called third party, that requests this party to either accept or deny the charges for the particular call. Here too, the third party can signify his or her response by answering verbally or entering a suitable digit on a telephone keypad. If a voice response is made, the VSN, as in the case of a collect call, then utilizes speaker independent voice recognition to ascertain whether the called party answered "YES" or "NO". Based upon the result, the VSN suitably informs the tandem switch to inform network 20 to either, in the case of charge acceptance, dial the call to the destination number with billing to the third party or, if the charge is denied, simply terminate the call in its entirety. If the charge is accepted, the network extends a connection between the caller and called parties but tears down the connection then extending to tandem switch 40 and therethrough to the VSN.

2. Call handling with SCP intervention—calling card calls

Unlike collect and bill-to-third party calls, calling card calls require use of an SCP to interrogate a database of calling card numbers to confirm the validity of an entered calling card number and then route or terminate the call accordingly through public switching network 20. An SCP is an on-line real time fault tolerant transaction processing system that provides call processing information (responses) in response to queries received via STPs connected within the signaling network. This call processing information can include call routing instructions, such as a valid (passing) or invalid (failing calling card number, or other instructions depending upon the information requested by a service switching point (SSP). The function of the SSP is to first recognize an incoming call as one requiring special handling —such as a calling card call, then suspend normal call processing, thereafter obtain appropriate routing instructions, such as ultimately through CCS network 60, and finally route the call according to the resulting instructions.

Several different database applications can be concurrently available on an SCP to implement several different calling services. The following discussion addresses one such application, calling card service. For a detailed discussion of one embodiment of an SCP, see U.S. Pat. No. 5,084,816 (issued Jan. 28, 1992 to J. O. Boese et al).

Processing a calling card call commences in the same fashion as with any other AABS type call, such as a bill-to-third or collect call as described above. The caller first dials "0+DN" after obtaining dial tone. A voice connection is established between VSN 50 and the caller at, e.g. telephone 3, via link 7 and through network 20 and tandem switch 40. The VSN, as in the case of a collect or bill-to-third party call, plays a voice announcement requesting the caller to select a manner through which the call is to be billed. For a calling card call, the caller merely dials his calling card number. Contrary to bill-to-third and collect calls, there is no need with calling card calls to elicit the name of the caller or record a spoken result. In any event, once a calling card number is entered, that number is collected by VSN 50 and passed to tandem switch 40. The tandem switch formulates an appropriate call processing packet message specifically a query message, containing the collected number, to an SCP to confirm the validity of this number. This query message also contains the network address of a network node (e.g., a switch) that originated this query. Shortly after the query message is fabricated, the tandem switch launches this message into CCS network 60 as a query packet for delivery to and processing by an appropriate SCP, which here is exemplified by SCP 91. For processing calling card calls, every packet received by an SCP is part of a separate transaction. Every transaction includes both a query packet sent to an SCP from an STP and a corresponding response packet generated thereto by the SCP and sent back to that STP. Inasmuch as many telephone service providers separately issue their own calling card numbers, the query message contains an address to the particular SCP that contains calling card databases that can confirm the validity of the particular calling card number then being used. Using the address, CCS network 60, and specifically the STPs contained therein, suitably route the query packet onward to the proper SCP. Shortly after receiving the query packet, SCP 91 then performs a database access into disk storage 94 and specifically into so-called "Line Information Database" (LIDB) 95 resident thereon which contains a table of calling card numbers and their present state as well as other caller related information not relevant here. The result of this access, i.e. whether the calling card number is valid or not, is inserted into a response message which the SCP then launches, as a response packet, into CCS network 60 for carriage back to tandem switch 40. Upon receipt of the response packet, tandem switch 40 further processes the call accordingly.

In the event the calling card number is indicated as being valid, tandem switch 40, upon receipt of the response packet, instructs network 20 and specifically SSP 30 situated therein to extend a connection through network 20, including, where required, through an appropriate inter-exchange carrier, between the caller and the destination number and to bill the charge for the call to the calling card number.

Alternatively, if the response packet indicates that the calling card number is invalid, the associated response message is routed to VSN 50 which may then play a suitable voice announcement to the caller to request re-entry of the calling card number, and so on to process the call and/or to terminate the call.

The CCS network consists of a multi-level hierarchy of signaling transfer points (STPs) which primarily act as packet switches to carry a message, in this case a packet, from an "originating" SSP to a particular "destination" SCP and to carry a packet containing a response message (call routing instructions) from that SCP back to the originating SSP which, in turn, completes the calling card call based upon the response message. As shown, CCS network 50 contains STPs 61, 63, 76 and 78 which are situated at different geographic locations within a given service region. STPs 61 and 63 receive incoming packets from SSP 30 and tandem switch 40 for subsequent routing through the CCS network. As a result, these STPs function as "originating" STPs. To ensure continued operation in the event of a link failure, each originating STP is connected through two separate bi-directional links, such as links 64 and 72 for STP 61, and links 66 and 74 for STP 63, to destination STPs 76 and 78. If one of the links, such as link 64, connecting an originating STP, such as STP 61, fails, then that STP routes packets, via the other link —here link 72, to the other destination STP. Destination STPs 76 and 78 are interconnected by bi-directional link 68 to route packets therebetween, if necessary. Hence, if STP 76 receives a packet destined for STP 78, the former STP routes the message over link 68 to the latter STP. Likewise, originating STPs 61 and 63 are inter-connected by bi-directional link 62 to route packets therebetween in the event of a link failure. Generally, CCS network 60 contains more than two originating and two destination STPs, and more than two STP levels wherein one or more levels of STPs are situated between the originating and destination STPs to provide packet routing therebetween. Each individual SSP, STP and SCP that exists within or is used in conjunction with a signaling network is often referred to as a "node".

Now, once SSP 30 formulates a query, this SSP routes an associated packet that contains this query and appropriate header information through an available link, such as link 36 or 38, to an originating STP, i.e. either STP 61 or 63, respectively, located within CCS network 60. The originating STP determines, using internal global title translation tables, an address of a particular SCP, such as SCP 91, which contains the appropriate databases necessary to provide the requested call routing instructions, i.e. the specific SCP which has internal databases that should store the dialed calling card number to which the current call is to be charged. This address is then inserted as a routing field that forms part of the header of the packet. Thereafter, the packet is routed from the originating STP to a destination STP within CCS network 60. Each STP that receives this packet examines its routing field and routes the packet onward accordingly. Once the destination STP receives the packet, it routes the packet to the particular SCP, such as SCP 91, specified within the header. SCP 91 then performs associated database look-up operations to validate the calling card number. After this has occurred, SCP 91 fabricates a packet that contains the validation information as a response message and a header that specifies the address of the switch that originated the original query and transmits the response message into the CCS network for carriage back to that switch.

This signaling network that has just been described and which is well known in the art utilizes CCITT signaling system 6 (SS6). This signaling system employs only one physical path for each link that connects any two components (SSPs, STPs, and SCPs) that reside within or are connected to the signaling network.

B. Inventive architecture for performing voice verification for calling card calls with voice template files and voice verification processing both centralized at a tandem office 1. General architecture FIG. 2 depicts inventive network embodiment 200 for performing voice verification, on a centralized tandem office basis, for calling card calls.

AS shown, system 200 is essentially formed by inserting inventive voice verification intelligent peripheral (VVIP) 300 in both the voice and data paths between tandem switch 40 and voice service node (VSN) 250, in system 100 shown in FIG. 1. To simplify FIG. 2, public switching network 20 and common channel signaling network 60, as well as their interconnecting links, (all of which have been described in some detail above) are only shown at a very high level. Furthermore, to simplify the following discussion, this figure only shows one SCP, e.g. SCP 91—though an actual network may typically contain several.

In accordance with our inventive teachings, VVIP 300 functions to intercept and hold certain call processing messages, specifically "PASSED LIDB" query responses, that originate from an SCP, e.g. SCP 91, while the VVIP performs voice verification of the caller in order to verify the specific identity claimed thereby. As discussed in detail below, this verification process also entails establishing a voice path to the caller over which various voice announcements are played to the caller and speech responses are obtained therefrom for storage, during caller enrollment, or for comparison, during subsequent caller verification. Once the caller identity is confirmed, in the manner discussed in detail below, the VVIP, which up to then has been holding a query response message, simply forwards this message onward to VSN 250 to allow normal calling card call processing to proceed and eventually result in the call being extended through public switching network 20 to the dialed destination number (DN). Inasmuch as the call processing messages are only somewhat delayed but not altered in any fashion by the VVIP, inclusion of voice verification into the network through use of the VVIP substantially, and usually totally, eliminates the need to change any of the programming within any network component, e.g. tandem switch 40, VSN 250 or SCP 91, or the hardware associated therewith. Thus, VVIP 300 is fully compatible with existing digital telephone networks that provide AABS and is readily and easily installed therein. Moreover, by advantageously siting voice verification templates entirely within the network, our inventive architecture (that shown in FIG. 2 as well as those shown in FIG. 15, 17 and 19) eliminates the need to encode any voice data on either a calling card or other media carried by any caller as well as the need to employ special purpose telephones. As such, our inventive voice verification techniques can advantageously function with nearly any, if not all, telephones presently in service.

As input, VVIP 300 accepts several identical T1 digitized voice trunks, of which only one such trunk 54 is specifically shown, and several identical RS-232C 19.2 KBaud serial data links, of which only one such link 52 is specifically shown, both emanating from tandem switch 40. Identical voice and data links connect the VVIP to the VSN: T1 voice trunks, of which only trunk 244 is specifically shown, and serial data links, of which only link 242 is specifically shown. The numbering scheme for the individual trunks and data links, that connect the tandem switch and the VVIP must be identical to that used for the individual trunks and data links that connect the VVIP to the VSN. By doing so, each trunk emanating from the VVIP will appear to the VSN as if that trunk emanated from the tandem switch rather than from the VVIP, with the same being true for the data links. Similarly, each link (trunk or data) from the VVIP will appear to the tandem switch as if that link emanated from the VSN rather than from the VVIP. Each of these data links carries X.25 type packet call messages from tandem switch 40. All the data links, both connecting tandem switch 40 and VSN 250, are so-called point-to-point links and operate in the permanent virtual circuit (PVC) mode. Only PVC 1 mode is used on each such link. Error conditions occurring on any incoming data link to the VVIP, either from the tandem switch or the VSN, are simply propagated to the corresponding outgoing data link from the VVIP, to the VSN or tandem switch, respectively. For example, if the VVIP detects that no flags are received on an incoming data link from the VSN, then, the VVIP simply stops sending flags on the corresponding data link to the tandem switch. To simplify the following discussion and facilitate understanding, even though the VVIP will support multiple separate trunks and data links to the tandem switch and to the VSN, only trunks 54 and 244, and data links 52 and 242 will be specifically discussed hereinafter with the other trunks and data links supported in the same fashion as discussed.

To provide a fail-safe connection as well as to facilitate installation without disrupting on-going traffic flow, links 222 and 226 are wired in parallel across the VVIP to connect trunk 54 with trunk 244, and data link 52 with data link 244. Links 222 and 226 contain normally closed (NC) switch contacts 236 and 238, respectively. VVIP 300 is wired in series with normally open (NO) switch contacts 232 and 234 to trunk 54 and data link 52, and to trunk 244 and data link 242. During installation or whenever VVIP 300 is to be taken out of service (for, e.g., maintenance or upgrading), contacts 232 and 234 are both opened and contacts 236 and 238 are both closed thereby routing call data messages and accompanying voice traffic around VVIP 300 and hence permitting call processing to occur normally between tandem switch 40 and VSN 250. Alternatively, whenever VVIP is to be brought into service to provide voice verification, contacts 236 and 238 are both opened and contacts 232 and 234 are both closed in order to route call data messages and accompanying voice traffic through the VVIP. In the event of a failure condition affecting the VVIP, contacts 232 and 234 are both immediately opened and contacts 236 and 238 are both immediately closed so as to take VVIP out of service and, by doing so, prevent the failure from affecting subsequent call traffic until such time as the failure condition is cleared. The specific operation of the VVIP, and particularly in the context of processing calling card calls is discussed in detail below with respect to FIGS. 4–14.

2. Voice Verification Intelligent Peripheral 300

FIG. 3 depicts a block diagram of voice verification intelligent peripheral (VVIP) 300.

a. VVIP internal structure

As shown, VVIP 300 contains computer controlled digital switching unit 310, which is typically a Summa 4 type switch (manufactured by Summa Four Corporation) or equivalent; an application processor, which is typically an appropriate workstation (such as a UNIX based workstation manufactured by Sun Microsystems, Inc.—"UNIX" is a registered trademark of Unix Systems Laboratory, Inc.); and voice verification system (VVS) 330. As discussed above, VVIP 300 intercepts all call processing messages but holds certain of these messages, specifically "PASSED LIDB" query responses, that originate from an SCP, e.g. SCP 91, while the VVIP verifies the identity of the caller by speaker dependent template matching. During the course of this process, various voice announcements are played to the caller and a voice template is obtained therefrom for either storage, during caller enrollment, or template matching, during subsequent caller verification. Once the caller identity is confirmed, the VVIP, which up to then has been holding a query response message, simply forwards this message onward to VSN 250 to allow normal calling card call processing to proceed and eventually result in the calling card call being extended through the public switching network to the dialed destination number.

Switching unit 310 is connected, at its trunk side, to tandem switch 40 through several T1 trunks, of which only trunk 54 is shown for simplicity. The line side of switching unit 310 is connected through several voice lines, of which only line 345 is shown for simplicity, to voice verification system (VVS) 330. This system is connected by various data paths, of which only data path 340 is shown for simplicity, to both application processor (AP) 350 and to switching unit 310. This data path carries call processing messages, specifically instructions and resulting data, among AP 350, VVS 330 and switching unit 310 to obtain appropriate call data and, in response thereto, control, through the AP, subsequent call handling provided by the latter two components. AP 350 itself contains several X.25 ports, of which only one dual port 357 is specifically shown. Each of these dual ports is inserted into a corresponding data path running between tandem switch 40 and VSN 250 to intercept call processing messages propagating therealong from the tandem switch and subsequently, at the conclusion of voice verification, release these messages to the VSN. As such, one port within X.25 dual port 357 is connected to X.25 data link 52 and the other port within this dual port is connected to X.25 data link 242. AP 350 also contains, as will be evident below, a subscriber profile database that stores records, containing, e.g., a calling card number(s) for each subscriber (e.g., also referred to herein as a "trial" customer) that will be permitted to use voice verification. Generally, although not explicitly shown, AP 350 is connected through two X.25 links to VSN 250; one of these links is active at any one time and the other is a stand-by link to be used in the event of a failure of the then active link or communication circuitry associated therewith. In practice, AP 350 should provide and support at least twelve separate X.25 ports for connections to various data links, as well as provide four separate data communication channels to communicate with switching unit 310, two separate VVSs and a remote terminal. In that regard, data link 320 permits AP 350 to be accessed from a remote terminal through a dial-up connection.

For expediency, VVS 330 is also implemented through a UNIX based workstation and which also includes appropriate software to perform voice verification. In that regard, a single workstation could alternatively be used to implement both AP 350 and VVS 330 by integrating the software functions performed by each.

Any one of several conventional techniques can be used to perform speech template matching. Although our present invention will function with any of these techniques, our implementation of VVS 330 preferably utilizes a widely known probabilistic technique commonly referred to as "Hidden Markov Modeling" (HMM). Advantageously, HMM provides a robust statistical framework for template matching in which speech signal variations can be systematically modeled at least more so than through "Dynamic Time Warping" (DTW—another widely used technique). HMM also allows an integrated approach to speech verification in which speech signals can be represented in different levels of sophistication, frames, phones, sentences and the like, with all of these levels designed to interact efficiently to produce highly reliable speech verification. Furthermore, signal variations, due to speaker differences, which require, e.g. multiple models for each digit, can be defined in a more flexible way than in a non-parametric method, such as DTW. Inasmuch as a software implementation of HMM would be readily apparent to those skilled in the art and does not form part of our present invention, we will not discuss it herein.

b. general functionality of WIP components

Application processor 350 controls the operation of switching unit 310 and WS 330 to implement voice verification. Specifically, the AP monitors and intercepts X.25 call messages appearing on data link 52 and emanating from tandem switch 40 and also on data link 242 and emanating from VSN 250. In response to a calling card call from a subscriber that is to be provided with voice verification service, AP 350 instructs switching unit 310 to establish an appropriate voice path between the caller and the VVS and, at the appropriate time during subsequent call processing, as described in detail below, hold a query response message provided by the tandem switch and instruct VVS system 340 to perform voice verification. Once voice verification is complete and successful, the AP forwards the held query response message onward to VSN 250 to complete call processing. The AP monitors and intercepts X.25 call messages totally transparent to both the tandem switch and the VSN.

VVS 330 performs voice verification, stores and collects voice templates and plays voice announcements. In use, the VVS initially collects a voice template for a spoken password from a subscriber during an enrollment procedure for a first calling card made by that subscriber. For subsequent calling card calls made by a caller claiming to be that subscriber, VVS 330 collects a voice template for the same password then spoken by the caller and compares that template to the template previously stored for the subscriber for the same password to determine whether these two templates match, to within a pre-defined accuracy. The results of the comparison are provided to application processor to control subsequent call processing. In order to properly interact with callers, the VVS plays appropriate voice prompt announcements during the voice verification procedure.

The specific tasks accomplished by VVS 330 vary depending upon whether the caller is making his or her first calling card call (as a subscriber), in which case the caller needs to enroll his voice template for a pre-defined password, or a subsequent calling card call, in which case a template is still collected for the same password but is verified against the template previously stored for the claimed subscriber.

Switching unit 310 switches, under control of application processor 350, a voice path between VVS 330 and VSN 350 to perform voice verification. Normally, a voice path exists between a caller and the VSN for calls handled therethrough. When the VVS is invoked, the switching unit places a specific voice channel, as specified by AP 350 in a connect (CONNECT-VVS) message (as discussed below), to place VSN 250 on hold and connect, through a line connection, the associated voice channel from tandem switch 40 to VVS 330 to play voice prompt announcements and collect speech. When the voice verification process is completed, the switching unit receives a disconnect (DISCONNECT-VVS) message (also discussed below) to disconnect the line connection and switch the specified voice channel from the tandem switch back to the VSN. To properly function with the TOPSVL VSN, switching unit 310 must meet the following conditions: (a) trunks 244 to VSN 250 are outgoing, while trunks 54 from the tandem switch are incoming; non-standard signaling is used such that the switching unit does not have to seize a trunk and wait for a so-called "wink" before using that trunk; (c) a pulse type is set to "No Pulse" (NP); (d) a start signal is set to immediate (IM); and a remote make busy field is set to YES (Y).

c. VVIP operational modes and internal databases

Operationally speaking, application processor 350 operates in two basic modes: normal and abnormal. While in the normal mode, the application processor interrupts call processing, specifically query response, messages passing from the tandem switch to the VSN, to perform voice verification, as will be described in detail below. In contrast, while in the abnormal mode, the application processor will simply relay all call processing messages it receives on either data link 52 or 242 to the other such link and thereby not affect call processing. While the application processor resides in the abnormal state, all voice channels from the tandem switch should either be in a maintenance state or be directly connected to the VSN through fail-safe connections 222 shown in FIG. 2. Furthermore, none of the voice channels would be connected to VVS 330, shown in FIG. 3, while the application processor remains in the abnormal state.

In the normal state, application processor maintains various databases 353. One such database, i.e. database 3513, a so-called "live call record database", tracks the status of each call then being handled by VVIP 300 and originating from a subscriber. A "live call record" is established within database 3513 for each such call and exists only as long as that call is being processed through the VVIP. Each live call record (entry) contains: a call identification (CALL ID) number, a voice channel identification (ID) number, the called number for this call, the calling number for this call and the current state for this call. Database 3515 maintains status information (idle, busy or out-of-service) for each VVS located within VVIP 300. Although VVIP 300 is shown in FIG. 3, for simplicity, as containing only one VVS, in actuality the VVIP will likely contain several such VVSs to provide sufficient capacity to handle an anticipated traffic load of simultaneous calls. Customer profile database 3511 contains the calling card number for each subscriber who is permitted to utilize voice verification. In addition, databases 353 includes a list of active voice channels. Through these and other internal and conventional databases (not shown), databases 353 are able to correlate a given voice channel on trunk 54 with a data channel on link 52. Using this correlation, the application processor coordinates the activity of switching unit 310 and VVS 330 to properly process each call that requires voice verification.

d. internal VVIP messages

The following messages are communicated, over data path 340, between AP 350 and VVS 330: START-VV, END-VV, ABORT-VV, SEND-TONE and VV-STATUS. The specific format of these messages is not critical provided the format is compatible to both VVS 330 and the AP. START-VV is sent from the AP to the VVS to start a voice verification session. This message contains a session identification (ID) number and, the calling card number of the subscriber as a subscriber ID. The END-VV message is sent from the VVS to the application processor to report the result of a particular voice verification session. This message contains the session ID and the results of that session. The ABORT-VV is sent from the application processor to the VVS to abort a particular voice verification session. This particular message merely contains a session ID. The SEND-TONE message is periodically sent from application processor 350 to each of the VVSs (only one of which is specifically shown) to test the integrity of each voice path between that VVS and the switching unit. This testing is needed inasmuch as the voice channels between the tandem switch and the VSN are normally connected through the switching unit and thus remain in an on-hook state as long as the VVIP remains in-use. When a VVS receives this message, this VVS plays a tone to the switching unit. The VV-STATUS message is transmitted by each VVS to the application processor to inform the application processor of any state change in that VVS. This information in this message specifies the new state of the associated VVS.

The following messages are communicated, over data path 340, between AP 350 and switching unit 310: CONNECT-VVS, DISCONNECT-VVS and SU-STATUS. The specific format of these messages is also not critical provided the format is compatible to both switching unit 310 and AP 350. The CONNECT-VVS message is transmitted by AP 350 to the switching unit to initiate a voice verification session. This message contains a session ID; the voice channel, specified by its ID number, to the VSN that will be held; the voice channel, again in terms of its specific ID, from the tandem switch that will be connected to VVS 330; and an identification of a particular line from the switching unit that will be connected therethrough to the specified voice channel from the tandem switch. The DISCONNECT-VVS message is sent from the application processor to switching unit 310 to terminate a voice verification session. This particular message contains a session ID; the voice channel to the VSN, specified in terms of its ID, that will be re-connected to the tandem switch; the voice channel from the tandem switch, specified in terms of its ID, that will be re-connected to the VSN, and the line associated with the switching unit, specified in terms of its ID, that is to be disconnected from the tandem switch. Lastly, the SU-STATUS message is sent from switching unit 310 to application processor 350 to report the current status of the switching unit. This message is also used to acknowledge the receipt of a tone from a VVS and identify a line on which such a tone is received.

e. VVIP Call Processing

1. Pertinent software

VVIP 300, specifically VVS 330 and AP 350 therein, executes various software routines, many of which, such as operating systems and the like, are irrelevant to call processing. Hence, to simplify and appreciably shorten the following discussion, we will only discuss, at a high level, those particular software routines pertinent to calling card call processing. The other routines, being dependent of the particular implementation of the VVIP, will be readily apparent to those skilled in the art.

Figure 4B:
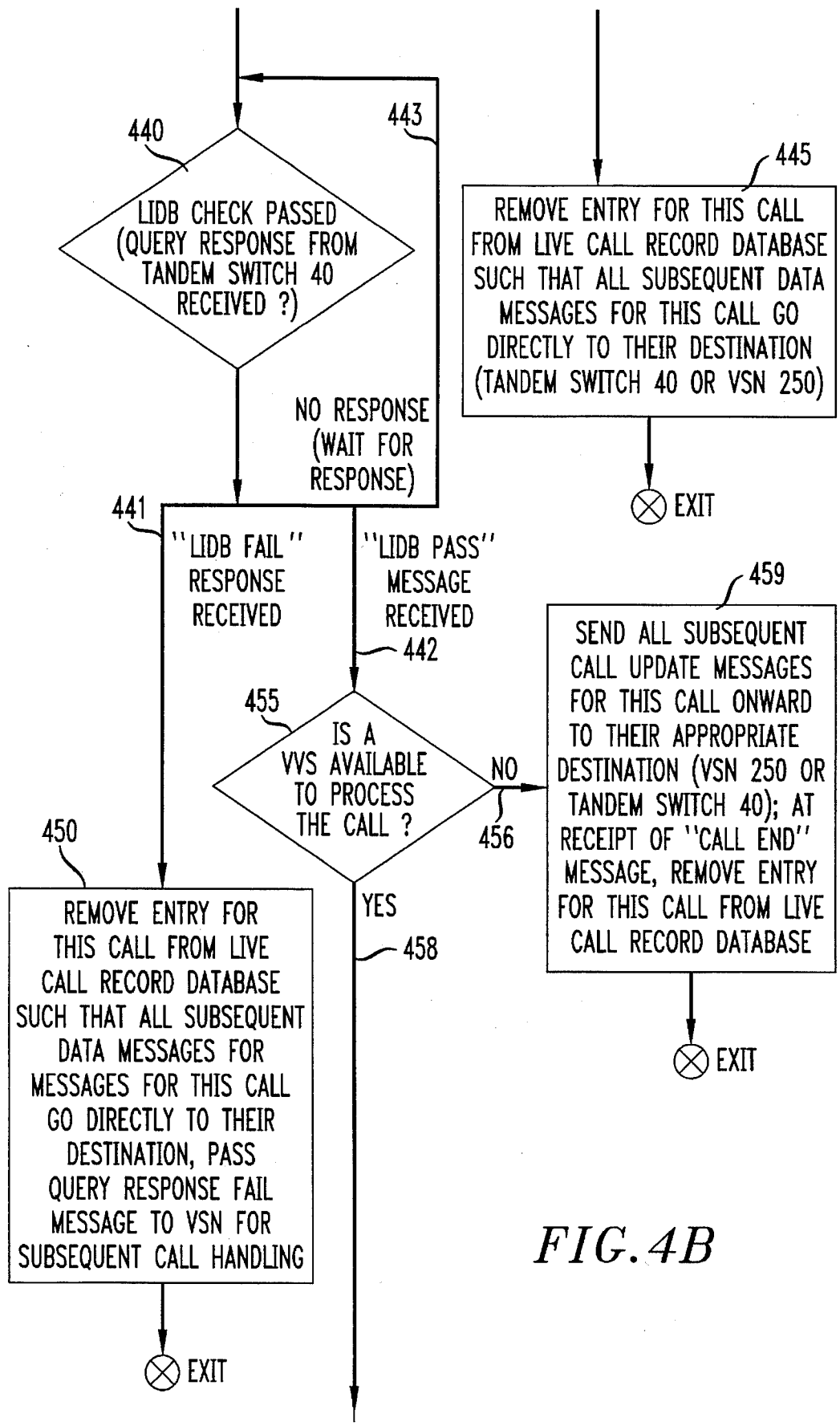

A high level flowchart of AP Call Processing routine 400, that is separately executed within AP 350 to process each calling card call, is collectively depicted in FIGS. 4A–4D, for which the correct alignment of the drawing sheets for these figures is shown in FIG. 4.

As discussed above, AP 350 monitors all the call processing messages that are to flow on data links 52 and 242 between tandem switch 40 and VSN 250 (see FIGS. 2 and 3). At the inception of a call that requires processing through the VSN, tandem switch 40 will issue a CALL BEGIN message to the VSN and hence route that message over link 52. In response to this message, AP 350 will execute routine 400, shown in FIGS. 4A–4D, to begin processing this call.

Upon entry into routine 400, execution first proceeds to block 405. This block, when executed, establishes a live call record (i.e. an entry) for this call in live call record database 3513 (see FIG. 3). As discussed above, this record is updated to track the progress of the call as it is processed through the VVIP. As shown in FIGS. 4A–4D, once this record is established through block 405, this block then passes the CALL BEGIN message onward, via link 242 (see FIGS. 2 and 3) to the VSN. Thereafter, execution proceeds, as shown in FIGS. 4A–4D, to decision block 410 which determines, from the CALL BEGIN message, whether the present call is a calling card call or not. In the event, this call is not a calling card call, then the VVIP will not provide voice verification or any further call processing. As such, execution proceeds, along NO path 413, from decision block 410 to block 415. This latter block, when executed, removes the entry for this call from the live call record database. As a result of doing so, AP 350 merely directs all subsequent X.25 call processing messages for this call, that originate from either the VSN or the tandem switch, onward to their appropriate destination (either the tandem switch or the VSN). Once block 415 fully executes, execution exits from routine 400 to a higher level process (not shown) executing within the AP.

Alternatively, if the present call is a calling card call, then decision block 410 routes execution, via YES path 411, to block 420. This latter block collects the calling card number from a subsequent ACTION REQUEST message issued by the VSN once it interrogates the caller and receives a response therefrom. Next, execution proceeds to block 425 which, when executed, passes the ACTION REQUEST message onward to the tandem switch in order to check the calling card number against the appropriate LIDB database at an SCP. After this message is passed, execution proceeds to decision block 430 which determines whether the caller, by interrogating an internal database situated within the AP with the calling card number, is a so-called "trial" customer and therefore will utilize voice verification. If the caller is not a "trial" customer, then decision block 430 routes execution, via NO path 433, to decision block 435. This latter decision block determines whether a CALL BEGIN or CALL END call processing message has been received, these messages respectively indicating that a new call is to be processed or a current call is terminated. If a message different from a CALL BEGIN or CALL END message (such as an ACTION REQUEST message) has been received from either the VSN or the tandem switch, then decision block 435 merely routes execution, via NO path 439, back to block 425 to transfer this message onward to its destination to appropriately continue processing the current call. For example, the VSN would issue an ACTION REQUEST message if the VSN required the caller to re-enter his or her calling card number and now needs to validate that number through a LIDB check. Alternatively, if the current message received is either a CALL BEGIN or a CALL END, then decision block 435 routes execution, via YES path 437, to block 445. This latter block, when executed, removes the entry for this call from the live call record database. As a result of doing so, AP 350 merely directs all subsequent X.25 call processing messages, for this call, that originate from either the VSN or the tandem switch, onward to their appropriate destination (either the tandem switch or the VSN). Once block 445 fully executes, execution exits from routine 400 to a higher level process (not shown) executing within the AP.

If the caller is a "trial" customer and therefore entitled to utilize voice verification, then the AP now merely waits for a query response, from the tandem switch, indicating the validity of the dialed calling card number. Accordingly, decision block 430 routes execution, via YES path 431, to decision block 440. This latter decision block tests the response received from the tandem switch. If no response has been received, then execution merely loops around this block, via path 443. If a LIDB FAIL response occurs, indicating that the dialed calling card number failed the LIDB check and hence is invalid, then decision block 440 routes execution, via path 441, to block 450. Block 450, when executed, removes the entry for this call from the live call record database. As a result of doing so, AP 350 merely directs all subsequent X.25 call processing messages, for this call, that originate from either the VSN or the tandem switch, onward to their appropriate destination (either the tandem switch or the VSN). Furthermore, block 450 also passes the LIDB FAIL response message to the tandem switch for use in subsequently processing this call, such as, e.g., terminating the call or instructing the VSN to prompt the caller to re-enter his or her calling card number to re-attempt the call. Once block 450 fully executes, execution exits from routine 400 to a higher level process (not shown) executing within the AP.

Now, if the tandem switch returns a LIDB PASSED message, thereby signifying that the calling card number entered by the caller is valid, then decision block 440 routes execution, via path 442, to decision block 455. This latter decision block determines, from VVS status database 3515 (discussed above and shown in FIG. 3) whether a voice verification system (only one of which, i.e. system 330 is specifically shown in FIG. 3) is currently available to handle the present call. Voice verification is only utilized for call made to a valid calling card number and if a voice verification system is then available to use in processing that call. If a voice verification system is not available (because all such systems are either busy or out-of-service), then decision block 455, shown in FIGS. 4A–4D, routes execution, via NO path 456, to block 459. This latter block merely directs all subsequent X.25 call processing messages, for this call, that originate from either the VSN or the tandem switch, onward to their appropriate destination (either the tandem switch or the VSN). Whenever, a CALL END message is received for this call, block 459 also removes the entry for this call from the live call record database. Once block 459 fully executes, execution exits from routine 400 to a higher level process (not shown) executing within the AP.

At this point in routine 400, with a valid calling card number and an available VVS, caller verification routine 460 executes to confirm the identity claimed by the caller through voice verification.

Specifically, to undertake voice verification, decision block 455 routes execution, via YES path 458, into routine 460 and specifically to block 465 situated therein. Block 465, when executed, stores (holds) the LIDB PASS message received from the tandem switch in a temporary buffer. At this point, this message is not passed onward to the VSN but merely retained at the VVIP until voice verification is complete. Once block 465 has executed, execution proceeds to block 468 which, when executed, instructs switching unit 310 (see FIG. 3) to establish a voice path to the caller. Once this path is established, execution passes to decision block 470 shown in FIGS. 4A–4C. This decision block determines whether the call is the first calling card call made, for the corresponding subscriber, under the now validated calling card number. If this is the first call, then no voice template exists within the VVIP for this caller; hence the caller needs to undergo an enrollment procedure. Accordingly, execution proceeds, via YES path 473, from decision block 470, to block 475. This latter block sends an appropriate message to the VVS that will process this call, e.g. VVS 330, to execute VVS Caller First Calling Card (Enrollment) routine 500 (discussed below in conjunction with FIGS. 5A and 5B) to properly enroll the caller by obtaining and storing a voice template for a pre-defined password. If the caller indicates that he does not wish to be enrolled at the moment, then execution passes, via dashed BY-PASS ENROLLMENT path 477, directly to block 497. Alternatively, if the call is not the first call made under the verified calling card number, then decision block 470, shown in FIGS. 4A–4D, routes execution, via NO path 471, to block 480. This latter block, when executed, sends an appropriate message to, e.g., VVS 330 to execute WS Calling Card Voice Verification routine 600 (discussed below in conjunction with FIGS. 6A and 6B) to verify the caller by obtaining a voice template for a given spoken password and comparing it against a stored voice template for the same password. Once either block 475 or 480, shown in FIGS. 4A–4D, has fully executed, execution then proceeds to decision block 485. This decision block simply waits for a response from, e.g., VVS 330, that indicates the results of the voice verification. In the absence of a response, execution merely loops around block 485, via NO path 487. Once a response occurs, execution proceeds, along YES path 489 emanating from decision block 485, to decision block 490. This latter decision block routes execution, via YES path 493 or NO path 491 to blocks 497 or 495, respectively, in the event the response indicates that the caller was verified or not. If the caller was verified, then block 497 merely forwards the presently retained X.25 LIDB PASS message, that has provided by the tandem switch and buffered within the AP, onward to the VSN to complete normal call processing for this calling card call. Alternatively, if the response indicates that the caller was not verified to be the corresponding subscriber, i.e. voice verification failed, then block 495 changes the X.25 LIDB PASS message, then being held, into an X.25 LIDB FAIL message and routes the changed message onward to the VSN in order to terminate the call. Once either block 495 or 497 executes, then execution exits from routine 400 to a higher level process (not shown) executing within the AP.

Figure 5B:
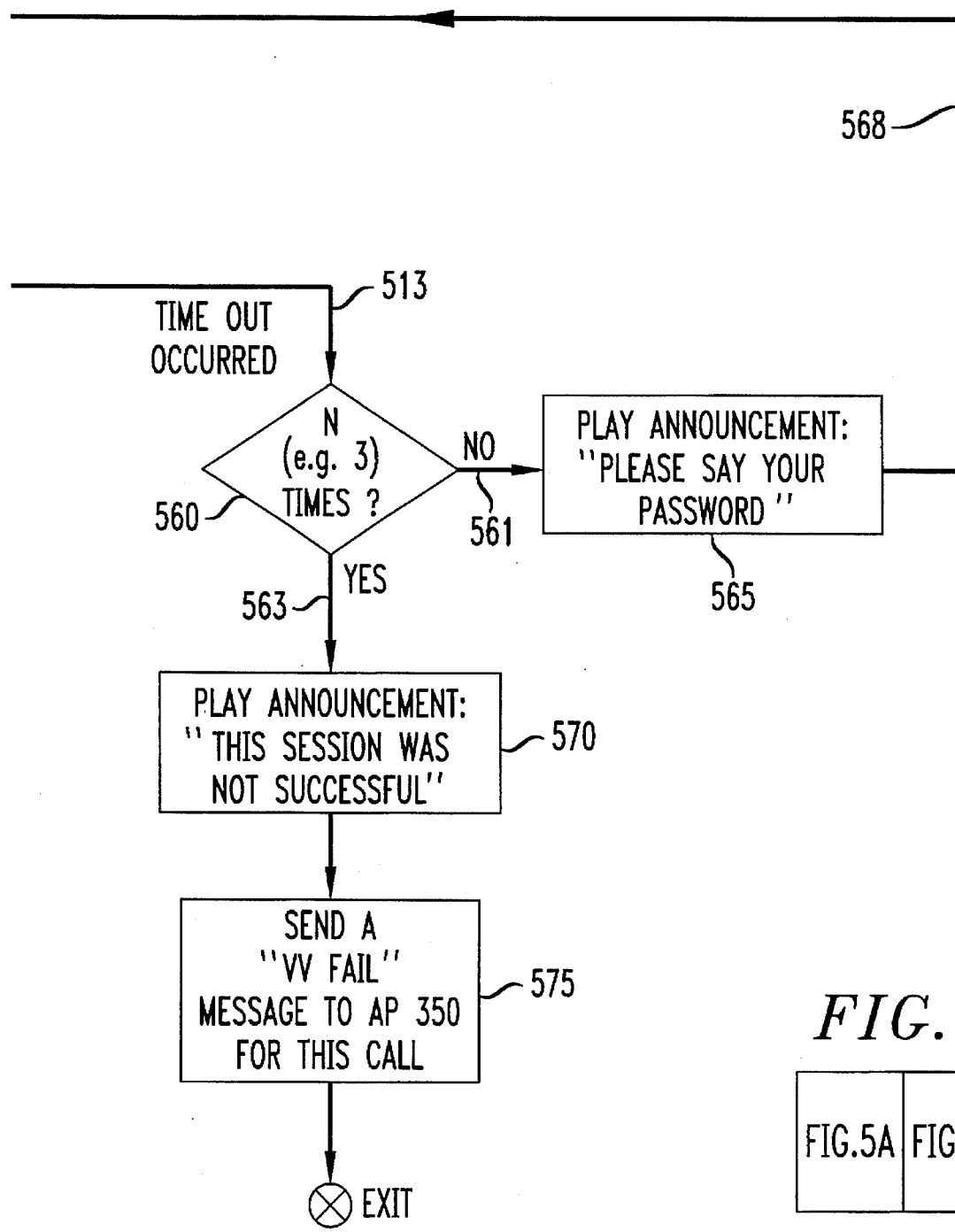
FIGS. 5A and 5B collectively depict a high level flowchart of VVS Caller First Calling Card (Enrollment) routine 500 that is executed within voice verification system (VVS) 330 shown in FIG. 3.
Figure 5A:
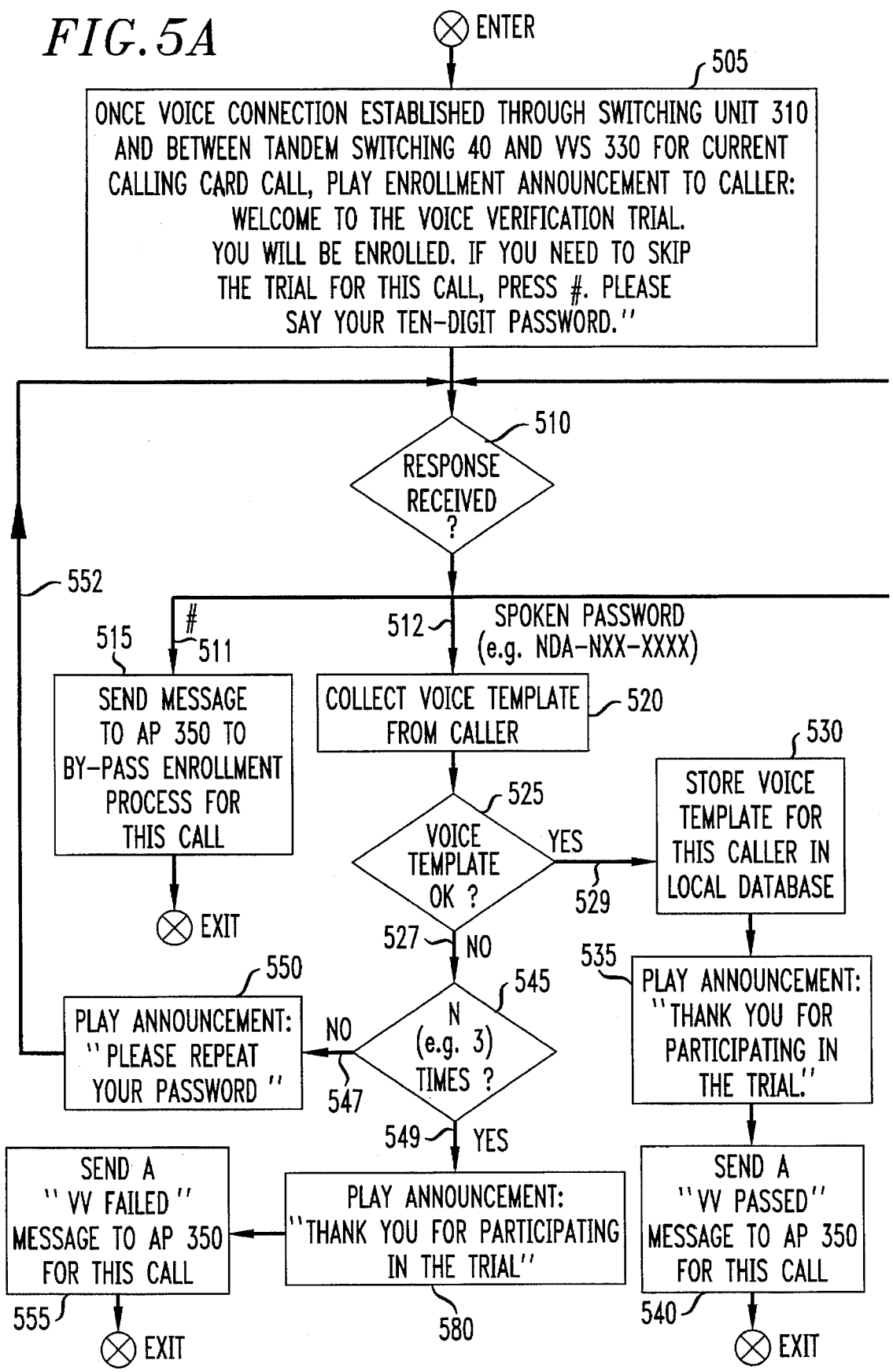

A high level flowchart of VVS Caller First Calling Card (Enrollment) routine 500 that is executed within VVS 330 is collectively depicted in FIGS. 5A and 5B, for which the correct alignment of the drawing sheets for these figures is shown in FIG. 5. As noted above, this routine, when executed at a VVS, enrolls the caller for subsequent voice verification.

In particular, upon entry into this routine, as shown in FIGS. 5A and 5B, execution proceeds to block 505. Once a voice connection has been established through switching unit 310 and between tandem switch 40 and VVS 330 for the current call being processed, block 505 when executed, causes a voice announcement to be placed to the caller. This announcement contains a welcome message and a prompt to the caller to either skip the trial, forego use of voice verification, or be enrolled by saying his or her password. This announcement is typically: "Welcome to the voice verification trial. You will now be enrolled. If you need to skip the trial for this call, press #. Please say your ten-digit password." To increase the accuracy achievable through speaker dependent voice template matching, each password is generally a pre-defined ten-digit number. Furthermore, such numerical passwords are easily randomized, a result which is not readily available with linguistic words. Of course, other passwords, such as textual words, combinations of words and numbers or even any other caller provided sound, could be used if desired, though with a possibly diminished verification accuracy as a result.

After this announcement is played by the VVS, the VVS merely waits for a response. Based upon the ensuing response, execution is routed by decision block 510 to one of three paths. First, if the response is a DTMF tone signifying depression of a "#" sign on the telephone keypad, then decision block 510 routes execution, via path 511, to block 515. This latter block, when executed, sends a message to the application processor (AP 350) stating that enrollment should be by-passed for this call and the call completed as if no voice verification was to occur. Once this message is sent, execution exits from routine 500. Within routine 400, shown in FIGS. 4A–4D, this by-pass message will cause execution to be routed, along dashed BY-PASS ENROLLMENT path 477, directly from block 475 to block 497 and complete the calling card call, as normal but without using voice verification.

Alternatively, if no response is received from the caller during a pre-defined interval of time such that a time-out has occurred, then decision block 510 routes execution, along path 513, to decision block 560. This latter decision block tests, through use of a software counter (not shown), whether the caller has now failed to enter a response three times (N=3) after being afforded two immediately prior opportunities to respond. If no such response has occurred during these three prompts, decision block 560 routes execution, via YES path 563, to block 570. This latter block causes the VVS to play an appropriate voice announcement signifying that the enrollment session was unsuccessful: "This session was not successful." Once this announcement has been played, block 575 executes to send a response message to the application processor stating that the voice verification failed for this call. Thereafter, execution exits from routine 500. Alternatively, if the caller has not been afforded two prior opportunities to respond, decision block 560 routes execution, via NO path 561, to block 565. This latter block, when executed, causes the VVS to play a voice announcement to the caller requesting the caller to say his password: "Please say your password." Once this announcement has been played, execution loops back, via path 568, to decision block 510 to once again await a response from the caller.

Lastly, if the caller responds by speaking his or her ten-digit number, typically and for trial purposes the telephone number (NPA-NXX-XXXX) of the caller, decision block 510 routes execution, via path 512, to block 520. This latter block, when executed, samples and collects a voice template from the user as the user speaks the password. Once the template is collected, execution proceeds to decision block 525. This block, when executed, analyzes the collected template to determine whether it is satisfactory. This test, which varies with the type of voice verification algorithm that will be used, generally involves determining whether the voice signal has, for example, a proper amplitude (i.e., the voice signal is not too loud or too soft), length (i.e., the voice template is not too short or too long) and clarity (i.e., the voice signal is not to noisy) to subsequently permit template matching to subsequently occur.

If decision block 525 concludes that the template is satisfactory, then execution proceeds, via YES path 529, to block 530. This latter block stores the template for the caller in a local database within, e.g., VVS 330. Thereafter, block 535 is executed to play a suitable voice announcement to the caller thanking him for his participation: "Thank you for participating in the trial." After this announcement has been played, execution proceeds to block 540 which, when executed, sends a response message (VV PASSED) to the application processor indicating that voice verification was successful for the call being handled. Thereafter, execution exits from routine 500.

Alternatively, if the template is not satisfactory for any reason, decision block 525 routes execution, via NO path 527, to decision block 545. This latter decision block determines, also through use of a software counter (not shown), whether three consecutive unsuccessful attempts have now occurred to collect a satisfactory voice template from the caller. If three such attempts have now occurred, then decision block 545 routes execution, via YES path 549, to block 580. This latter block plays a voice announcement thanking the caller for participating in the trial: "Thank you for participating in the trial.". Once this message has been played, execution proceeds to block 555 which executes to send a response message (VV FAIL) to the application processor stating that the voice verification failed for this call. Thereafter, execution exits from routine 500. If, however, three such attempts have not yet occurred, then decision block 545 routes execution, along NO path 547, to block 550. This latter block, when executed, plays a voice announcement to the caller requesting the caller to once again speak his password: "Please repeat your password.". Once this occurs, execution loops back, via path 552, to block 510 to once again await a response from the caller.

Figure 6B:
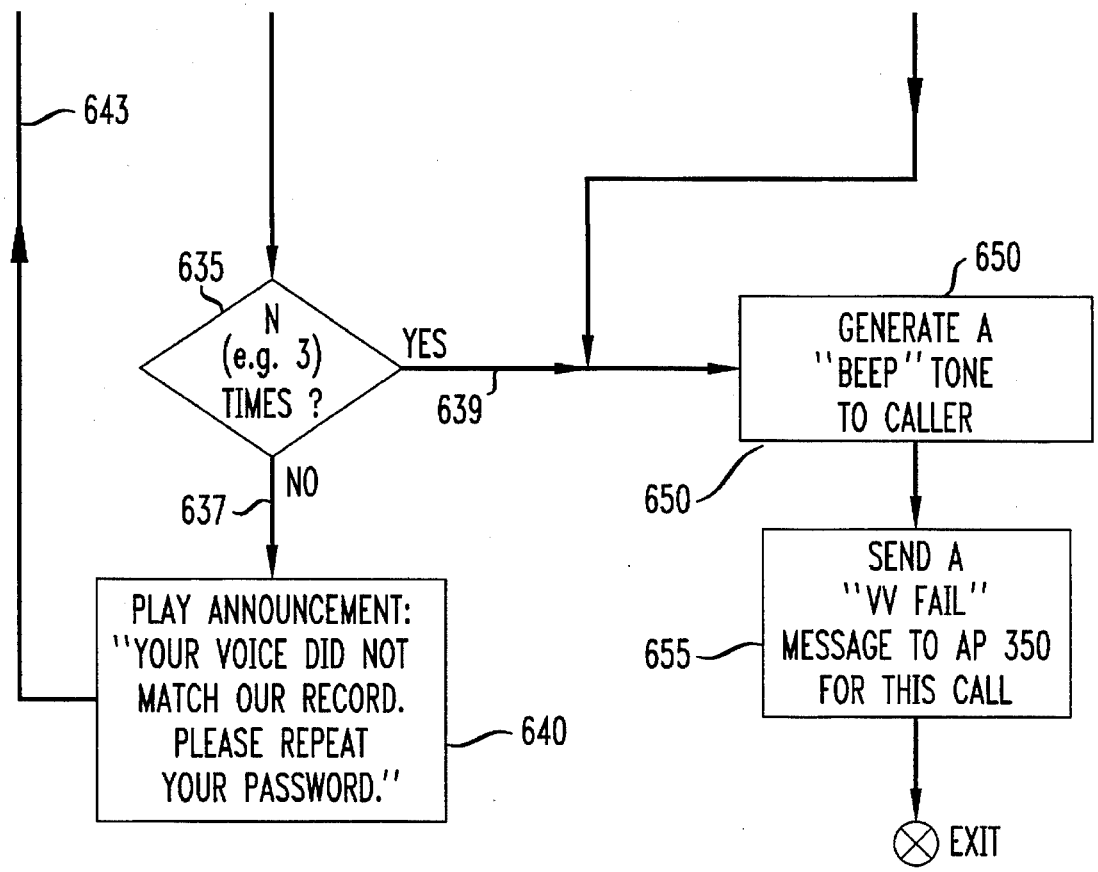
Figure 6:
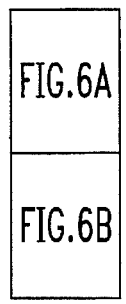
FIG. 6 depicts the correct alignment of the drawing sheets for FIGS. 6A and 6B.

A high level flowchart of VVS Caller Calling Card Voice Verification routine 600, that is also executed within VVS 330, is collectively depicted in FIGS. 6A and 6B, for which the correct alignment of the drawing sheets for these figures is shown in FIG. 6. As noted above, this routine, when executed in, e.g., VVS 330, performs voice verification of the caller.

In particular, upon entry into routine 600 shown in FIGS. 6A and 6B, execution proceeds to block 605. Once a voice connection has been established through switching unit 310 and between tandem switch 40 and VVS 330 for the current call being processed, block 605 plays a voice announcement to the caller. This announcement prompts the caller to speak his password: "Please say your ten-digit password.". Once this announcement has been played, execution proceeds to decision block 610 to await a response from the caller.

In the event that this response is anything other than a spoken ten-digit password or nothing at all during a pre-defined time interval, such that a time out has occurred, then decision block 610 routes execution, along path 613, to decision block 645. This latter decision block ascertains, through a software counter (not shown), whether the caller has now failed to enter a ten-digit password three times (N=3) after being afforded two immediately prior opportunities to do so. In the event three such unsuccessful attempts have now occurred, then decision block 645 routes execution, via YES path 649, to block 650. This latter block, when executed, simply causes a suitable tone ("BEEP" tone) to be played to the caller to signify that voice verification has failed. Thereafter, execution proceeds to block 655 to send a response message (VV FAIL) to the application processor stating that the voice verification has now failed for this call. Thereafter, execution exits from routine 600. Alternatively, if the caller has not been afforded two prior opportunities to respond, decision block 645 routes execution, via NO path 647, back to block 610 to once again await a response from the caller.

Alternatively, as soon as the caller begins to speak what may be construed as a password, execution proceeds from decision block 610, along path 611, to block 615. This latter block, when executed, samples and collects a voice template for the password as spoken by the caller. Once this template has been fully collected, block 620 is executed to read the voice template that, during an enrollment process, has been previously stored for the corresponding subscriber. With these two templates, execution then proceeds to decision block 625 which, when executed, determines whether these templates match to a pre-defined degree of accuracy. As noted above, the specific technique, that is used within this decision block, to determine a template match does not form part of our present invention. Since, our invention will work with nearly any of these techniques, those skilled in the art can readily select any one of a wide variety of conventional techniques to practice our invention. Nevertheless, for the reasons stated above, we prefer to utilize the Hidden Markov Modeling technique. In any event, if decision block 625 determines that the templates do, in fact, match, then this decision block routes execution, via YES path 629, to block 630. Block 630, when executed, sends a response message (VV PASSED) to the application processor indicating that voice verification was successful for the current call being handled. Thereafter, execution exits from routine 600.

Alternatively, if decision block 625 determines that the stored voice template for the caller does not match the template that was just collected, execution is passed, via NO path 627 emanating from this decision block, to decision block 635. This latter decision block ascertains, through a software counter (not shown), whether the a template match has now failed to occur during three successive attempts. In the event three such unsuccessful attempts have now occurred, then decision block 635 routes execution, via YES path 639, to block 650. This latter block, when executed, simply causes a suitable tone ("BEEP" tone) to be played to the caller to signify that voice verification has failed. Thereafter, execution proceeds to block 655 to send a response message (VV FAIL) to the application processor stating that the voice verification has now failed for this call. Thereafter, execution exits from routine 600. Alternatively, if three such attempts have not yet occurred, decision block 635 routes execution, via NO path 637, to block 640. This latter block, when executed, causes a voice announcement to be played to the caller stating that a match did not occur and prompting the caller to repeat his or her password: "Your voice did not match our records. Please repeat your password.". Once this announcement is played, execution loops back, via path 643, to block 610 to once again await a response from the caller and attempt to match that response against the template previously stored for the corresponding subscriber.

2. State diagrams

With the above description in mind, FIGS. 7, 8, 9 and 10 respectively show state tables 700, 800, 900 and 1000. State tables 700 and 800, respectively, depict state information for switching unit 310, shown in FIG. 3, for call data messages arriving on incoming trunks from tandem switch 40, and for call data messages placed on outgoing trunks to VSN 250. State table 900, shown in FIG. 9, depicts state information for application processor (AP) 350, shown in FIG. 3, for a voice channel or a call identification (CALL ID) message. Lastly, state table 1000 provides state information for VVS 330 shown in FIG. 3. Each of these tables lists each state in which the corresponding VVIP component can exist, a particular event, which when it occurs in that state, requiring a response (action), the particular response evoked and the next state in which that component will be placed. From both the preceding discussion and the tables depicted in these figures, those skilled in the art will readily and fully understand, without any further explanation, the state information for each of these VVIP components.

3. Inter-unit communication (protocol)

We will now discuss, with specific reference to the protocol diagrams shown in each of FIGS. 11–14, the inter-unit communication that occurs in conjunction with VVIP 300 for processing various calls and under various operational conditions. To fully appreciate these protocol diagrams, the reader should also simultaneously refer to FIGS. 2 and 3 throughout the following discussion.

FIG. 11 depicts, at a high level form, the inter-unit communication that occurs with and within VVIP 300 for processing a calling card call when a successful LIDB check has occurred for that call and a voice verification system is available to handle that call.

Specifically, prior to the commencing the processing of a specific calling card call through VVIP 300, switching unit 310 establishes a voice path (on-hook), as symbolized by lines 1105 and 1110, between tandem switch 40 and VSN 250. The switching unit accomplishes this by simply connecting, as symbolized by operation 1107, a voice channel associated with each of these units together.

To commence processing such a call, tandem switch 40 issues, as symbolized by line 1115, a CALL BEGIN message over X.25 link 52. This message is intercepted by the application processor within VVIP 300 which, as discussed above, establishes, as symbolized by operation 1117, a new live call record (entry) in live call record database 3513. Thereafter, the application processor forwards, as symbolized by line 1120, the CALL BEGIN message onward to VSN 250. Once this occurs, the VSN plays various suitable voice announcements, as discussed above and symbolized by line 1125, to the caller in order to obtain the calling card number therefrom. Once the VSN collects the calling card number, the VSN issues, as symbolized by line 1130, an ACTION REQUEST message to tandem switch 40 and ultimately, in the form of a query message, to an SCP, e.g. SCP 91, in order to validate the calling card number. The application processor intercepts this message and, if the caller is permitted to use voice verification (i.e. is a "trial" subscriber) and if VVS 330 is then available for use, prepares to invoke voice verification, as discussed above in conjunction with routine 400 shown in FIGS. 4A–4D. The application processor also forwards the ACTION REQUEST message onward, as shown in FIG. 11 and symbolized by line 1135, to the tandem switch to invoke the appropriate SCP query. Once the SCP furnishes a successful query response and shortly after that response reaches the tandem switch, this switch issues, as symbolized by line 1140, a CALL UPDATE ("LIDB PASS") message which indicates that the calling card number is valid. As discussed above and as symbolized by operation 1143, the application processor intercepts this CALL UPDATE message and temporarily holds this message pending completion of voice verification. Concurrent therewith, the application processor issues, as symbolized by line 1145, a START-VV message to VVS 330 to initiate voice verification. Once this message has issued, the application processor issues, as symbolized by line 1150 and operation 1153, a CONNECT-VVS message to switching unit 310 to establish a voice path between the caller and the VVS as well as to place the voice channel between the caller and the VSN on hold. Thereafter, VVS 330 performs a voice verification session, as discussed in detail above, to verify the identity claimed by the caller. Once the voice verification session concludes, VVS 330 issues, as symbolized by line 1155, an END-VV message signifying to the application processor that this session has just ended. As a result, the application processor then issues, as symbolized by line 1160 and operation 1167, a DISCONNECT-VVS message to the switching unit to disconnect the VVS from the voice path to the caller and re-connect the VSN. In addition, the application processor now forwards, as symbolized by line 1165, to the VSN the CALL UPDATE message which the application processor previously intercepted, from the tandem switch, and held. As discussed above, this message, based on a query response, specifies that the calling card number that has been dialed for the present call has passed, i.e. been validated by, the LIDB check. Once this message has been processed by the VSN, the VSN plays, as symbolized by operation 1170, a voice announcement thanking the caller for using the service provider. Once this announcement has been played, the VSN issues, as symbolized by line 1175, an ACTION REQUEST message to "float the call", i.e. an instruction to the tandem switch to extend the current call from the location of the caller through the public switching network to the destination number. Although this ACTION REQUEST message is also intercepted by the application processor within the VVIP, the application processor, now that voice verification is completed, simply forwards this message onward, as symbolized by line 1180, to the tandem switch which, in turn, instructs the public switching network accordingly to fully extend the call to its destination number. Once the call is over and the tandem switch is so informed by the switching network, the tandem switch issues, as symbolized by line 1185, a CALL END message for this call. After this message is intercepted by the application processor, the application processor, as symbolized by operation 1187, removes the entry for this call from live call record database 3513 (see FIG. 3) and, as shown in FIG. 11, forwards, as symbolized by line 1190, the CALL END message onward to the VSN to then terminate its processing of the call.

FIG. 12 depicts, at a high level, inter-unit communication that occurs, with and within VVIP 300 for processing a calling card call when a successful LIDB check has occurred for that call but, in contrast to that shown in FIG. 11, when a voice verification system is not available to handle that call. In this example, the call is processed in a totally normal fashion by the VSN and the tandem switch but without any real intervention (other than to merely forward call processing messages and to appropriately update the live call record for this call) by the VVIP.

Here, call processing begins in the same fashion as that shown in FIG. 11. Specifically, prior to the commencing the processing of a specific calling card call through VVIP 300, switching unit 310 establishes a voice path (on-hook), as symbolized by lines 1205 and 1210, between tandem switch 40 and VSN 250. The switching unit accomplishes this by simply connecting, as symbolized by operation 1207, a voice channel associated with each of these units together. Thereafter, at the onset of the call, tandem switch 40 issues, as symbolized by line 1215, a CALL BEGIN message over X.25 link 52. This message is intercepted by the application processor within VVIP 300 which, as discussed above, establishes, as symbolized by operation 1217, a new live call record (entry) in live call record database 3513. Thereafter, the application processor forwards, as symbolized by line 1220, the CALL BEGIN message onward to VSN 250. Once this occurs, the VSN plays various suitable voice announcements, as discussed above and symbolized by line 1225, to the caller in order to obtain the calling card number therefrom. Once the VSN collects the calling card number, the VSN issues, as symbolized by line 1230, an ACTION REQUEST message to tandem switch 40 and ultimately, in the form of a query message, to an SCP, e.g. SCP 91, in order to validate the calling card number. The application processor intercepts this message and, if the caller is permitted to use voice verification (i.e. is a "trial" subscriber) and if VVS 330 is then available for use, prepares to invoke voice verification, as discussed above in conjunction with routine 400 shown in FIGS. 4A–4D. However, here and as symbolized by operation 1233, VVS 330 is not available to process this call. As a result, voice verification is simply not performed for this call. In this case, VVIP 300 does not process this call and merely forwards all call processing messages it receives from either the tandem switch or the VSN onward to the other without holding, for any appreciable time, any of these messages.

Here, as in the case shown in FIG. 11, the application processor forwards the ACTION REQUEST message onward, as shown in FIG. 12 and symbolized by line 1235, to the tandem switch to invoke the appropriate SCP query to validate the calling card number. Once the SCP furnishes a successful query response and shortly after that response reaches the tandem switch, this switch issues, as symbolized by line 1240, a CALL UPDATE message ("LIDB PASS") which indicates that the calling card number is valid. As discussed above and as symbolized by operation 1243, the application processor intercepts the CALL UPDATE message, but since no VVS is currently available to perform voice verification for this call, this message is buffered until it can be forwarded onward to the VSN. Once the application processor can send the CALL UPDATE message onward to the VSN, it does so, as symbolized by line 1245. Once the CALL UPDATE message has been processed by the VSN, the VSN plays, as symbolized by operation 1247, a voice announcement thanking the caller for using the service provider. Once this announcement has been played, the VSN issues, as symbolized by line 1250, an ACTION REQUEST message to "float the call". Although this ACTION REQUEST message is also intercepted by the application processor within the VVIP, the application processor simply forwards this message onward, as symbolized by line 1255, to the tandem switch which, in turn, instructs the public switching network accordingly to fully extend the call to its destination number. Once the call is over and the tandem processor is so informed by the switching network, the tandem switch issues, as symbolized by line 1260, a CALL END message for this call. After this message is intercepted by the application processor, the application processor, as symbolized by operation 1263, removes the entry for this call from live call record database 3513 (see FIG. 3) and, as shown in FIG. 12, forwards, as symbolized by line 1265, the CALL END message onward to the VSN to then terminate its processing of the call.

FIG. 13 depicts, at a high level, inter-unit communication that occurs, with and within VVIP 300 for processing a calling card call that was not made by a "trial" customer. In this example, the call is also processed in a totally normal fashion by the VSN and the tandem switch but without any real intervention (other than, in this case, to merely forward call processing messages) by the VVIP. The live call record for this call is not maintained during the course of the call.

Here, call processing begins in the same fashion as that shown in FIGS. 11 and 12. Specifically, prior to the commencing the processing of a specific calling card call through VVIP 300, switching unit 310 establishes a voice path (on-hook), as symbolized by lines 1305 and 1310, between tandem switch 40 and VSN 250. The switching unit accomplishes this by simply connecting, as symbolized by operation 1307, a voice channel associated with each of these units together. Thereafter, at the onset of the call, tandem switch 40 issues, as symbolized by line 1315, a CALL BEGIN message over X.25 link 52. This message is intercepted by the application processor within VVIP 300 which, as discussed above, establishes, as symbolized by operation 1317, a new live call record (entry) in live call record database 3513. Thereafter, the application processor forwards, as symbolized by line 1320, the CALL BEGIN message onward to VSN 250. Once this occurs, the VSN plays various suitable voice announcements, as discussed above and symbolized by line 1325, to the caller in order to obtain the calling card number therefrom. Once the VSN collects the calling card number, the VSN issues, as symbolized by line 1330, an ACTION REQUEST message to tandem switch 40 and ultimately, in the form of a query message, to an SCP, e.g. SCP 91, in order to validate the calling card number. The application processor intercepts this message and, if the caller is permitted to use voice verification (i.e. is a "trial" subscriber) and if VVS 330 is then available for use, prepares to invoke voice verification, as discussed above in conjunction with routine 400 shown in FIGS. 4A–4D. However, here and as symbolized by operation 1333, the caller is not a "trial" customer, i.e. his calling card number has not been entered within customer profile database 3511, and hence is not permitted to use voice verification. As such, VVIP 300 does not process this call and merely forwards all call processing messages it receives for this call (with exception of CALL BEGIN, ACTION REQUEST and CALL END messages—for the reasons specifically discussed above) from either the tandem switch or the VSN onward to the other without holding, for any appreciable time, any of these messages. Furthermore, the live call record that has been established for this call is simply deleted at this point.

As in the case shown in FIGS. 11 and 12, the application processor forwards the ACTION REQUEST message onward, as shown in FIG. 13 and symbolized by line 1335, to the tandem switch to invoke the appropriate SCP query to validate the calling card number. Once the SCP furnishes a successful query response and shortly after that response reaches the tandem switch, this switch issues, as symbolized by line 1340, a CALL UPDATE message which indicates that the calling card number is valid. As discussed above, the application processor intercepts the CALL UPDATE message, but since the caller is not a "trial" subscriber, this message ("LIDB PASS") is simply forwarded onward to the VSN. Once the application processor can send the CALL UPDATE message onward to the VSN, it does so, as symbolized by line 1345. After the CALL UPDATE message has been processed by the VSN, the VSN plays, as symbolized by operation 1350, a voice announcement thanking the caller for using the service provider. Once this announcement has been played, the VSN issues, as symbolized by line 1355, an ACTION REQUEST message to "float the call". Although this ACTION REQUEST message is also intercepted by the application processor within the VVIP, the application processor simply forwards this message onward, as symbolized by line 1360, to the tandem switch which, in turn, instructs the public switching network accordingly to fully extend the call to its destination number. Once the call is over and the tandem processor is so informed by the switching network, the tandem switch issues, as symbolized by line 1365, a CALL END message for this call. After this message is intercepted by the application processor, this processor forwards, as symbolized by line 1370, the CALL END message onward to the VSN to then terminate its processing of the call.

Figure 14:
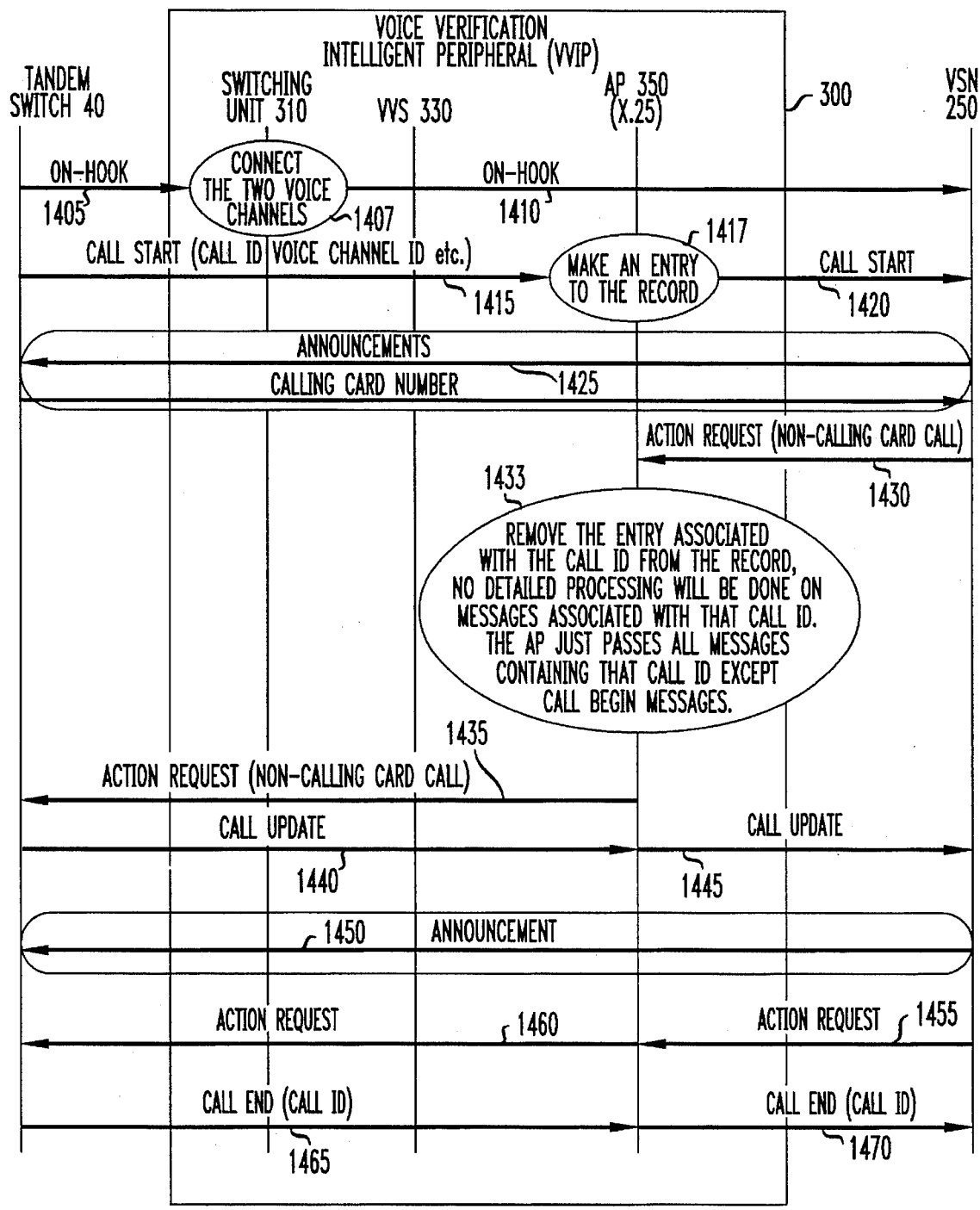
FIG. 14 depicts, at a high level, a protocol diagram of inter-unit communication that occurs, for system 200 shown in FIG. 2 and VVIP 300 shown in FIG. 3, for handling a non-calling card call.

FIG. 14 depicts, at a high level, inter-unit communication that occurs with and within VVIP 300 for handling a non-calling card call. Here too, the call is also processed in a totally normal fashion by the VSN and the tandem switch but also without any real intervention (other than, in this case, to merely forward call processing messages) by the VVIP. Also, the live call record for this call is not maintained during the course of the call.

Here, call processing begins in the same fashion as that shown in FIGS. 11–13. Specifically, prior to the commencing the processing of a specific calling card call through VVIP 300, switching unit 310 establishes a voice path (on-hook), as symbolized by lines 1405 and 1410, between tandem switch 40 and VSN 250. The switching unit accomplishes this by simply connecting, as symbolized by operation 1407, a voice channel associated with each of these units together. Thereafter, at the onset of the call, tandem switch 40 issues, as symbolized by line 1415, a CALL BEGIN message over X.25 link 52. This message is intercepted by the application processor within VVIP 300 which, as discussed above, establishes, as symbolized by operation 1417, a new live call record (entry) in live call record database 3513. Thereafter, the application processor forwards, as symbolized by line 1420, the CALL BEGIN message onward to VSN 250. Once this occurs, the VSN plays various suitable voice announcements, as discussed above and symbolized by line 1425, to the caller in order to obtain the calling card number therefrom. However, rather than obtaining a calling card number, the caller specifies a different manner through which the caller is to be charged, e.g. a bill-to-third party or collect call. Consequently, once the VSN collects sufficient information from the caller, the VSN issues, as symbolized by line 1430, an ACTION REQUEST message for a non-calling card call to tandem switch 40 to appropriately process the call. The application processor intercepts this message. Since the call is a non-calling card call, VVIP 300 does not process this call and merely forwards all call processing messages it receives for this call (with exception of CALL BEGIN messages—for the reasons specifically discussed above) from either the tandem switch or the VSN onward to the other without holding, for any appreciable time, any of these messages. Furthermore, the live call record that has been established for this call is simply deleted at this point.

AS in the case shown in FIGS. 11–13, the application processor forwards the ACTION REQUEST message for a non-calling card call onward, as shown in FIG. 14 and symbolized by line 1435, to the tandem switch to invoke proper call processing. Thereafter, and once this processing has concluded, the tandem switch issues, as symbolized by line 1440, a CALL UPDATE message which indicates the results of this processing. As discussed above, the application processor intercepts the CALL UPDATE message, but since the call is a non-calling card call, this message is simply forwarded onward, as symbolized by line 1445, to the VSN. After the CALL UPDATE message has been processed by the VSN, the VSN plays, as symbolized by operation 1450, an appropriate voice announcement to the caller thanking the caller for using the service provider. Once this announcement has been played, the VSN issues, as symbolized by line 1455, an appropriate ACTION REQUEST message to "float the call". Although this ACTION REQUEST message is also intercepted by the application processor within the VVIP, the application processor simply forwards this message onward, as symbolized by line 1460, to the tandem switch which, in turn, instructs the public switching network accordingly to fully extend the call to its destination number. Once the call is over and the tandem processor is so informed by the switching network, the tandem switch issues, as symbolized by line 1465, a CALL END message for this call. After this message is intercepted by the application processor, this processor forwards, as symbolized by line 1470, the CALL END message onward to the VSN to then terminate its processing of the call.

The centralized tandem office based architecture discussed above in conjunction with FIGS. 2–14 provides excellent performance as well as easy integration into the existing telephone network without the need to change any of the programming of existing switches. Unfortunately, this architecture operates within a geographic area served by a single tandem office and thus could be easily by-passed. In that regard, voice verification system 300 locally stores customer profiles and voice templates only for those callers that originate calls within the geographic area served by tandem switch 40 (see FIGS. 2 and 3). Of course, generally speaking, that tandem switch can be associated with any service provider, be it any long distance carrier or any local telephone company. In any event, any caller situated outside this area but who calls into the area would not access tandem switch 40; they would access a different tandem switch and one that covers the geographic area where the caller is situated and from which a corresponding call originates. If voice verification were only to be offered in conjunction with tandem 40, then all these out-of-area callers would simply by-pass tandem switch 40 and not use voice verification. Therefore, if this tandem based architecture were to be expanded to encompass the area covered by an entire network, then appropriate databases and processing equipment within a VVIP would need to be replicated for each and every tandem office. Moreover, these databases would need to contain a profile and voice template of every subscriber located anywhere within the entire network. This would lead to excessive, unnecessary and costly duplication of both equipment and data.

c. Inventive SS7 based centralized architectures for performing voice verification for calling card calls Currently, signaling system 7 (SS7) is being implemented throughout many telephone networks to, inter alia, provide signaling compatibility across these networks as well as to permit switching equipment in any one network to gain ready access to customer data stored on an SCP contained in any other such network. Having such access would permit a caller, essentially regardless of his location, to complete a call by having a calling card number (or other information) validated through any SCP regardless of its network affiliation.

By modifying the tandem-based architecture shown in FIGS. 2 and 3 to utilize, inter alia, SS7 and the remote centralized database processing capability it supports, we have remedied these deficiencies and, by doing so, are able to cost-effectively and efficiently provide voice verification on a centralized carrier independent basis. We will now describe, with reference to FIGS. 15–20, three different SS7 based embodiments of our invention that provide varying degrees of centralized voice verification. The network switches and associated voice processing components that will be used to implement each of these embodiments are very similar to those described above though with the appropriate SS7 interfaces. Consequently, since their particular implementation, given the above and following descriptions, would be readily apparent to any one skilled in the art, we will limit our description of all of these switches and components to only a high level. Moreover, since the internal signaling protocol and the various message layers utilized by SS7 itself do not form part of the present invention and are both well known to those skilled in the art, these aspects of SS7 will also not be discussed in any detail herein.

Figure 15:
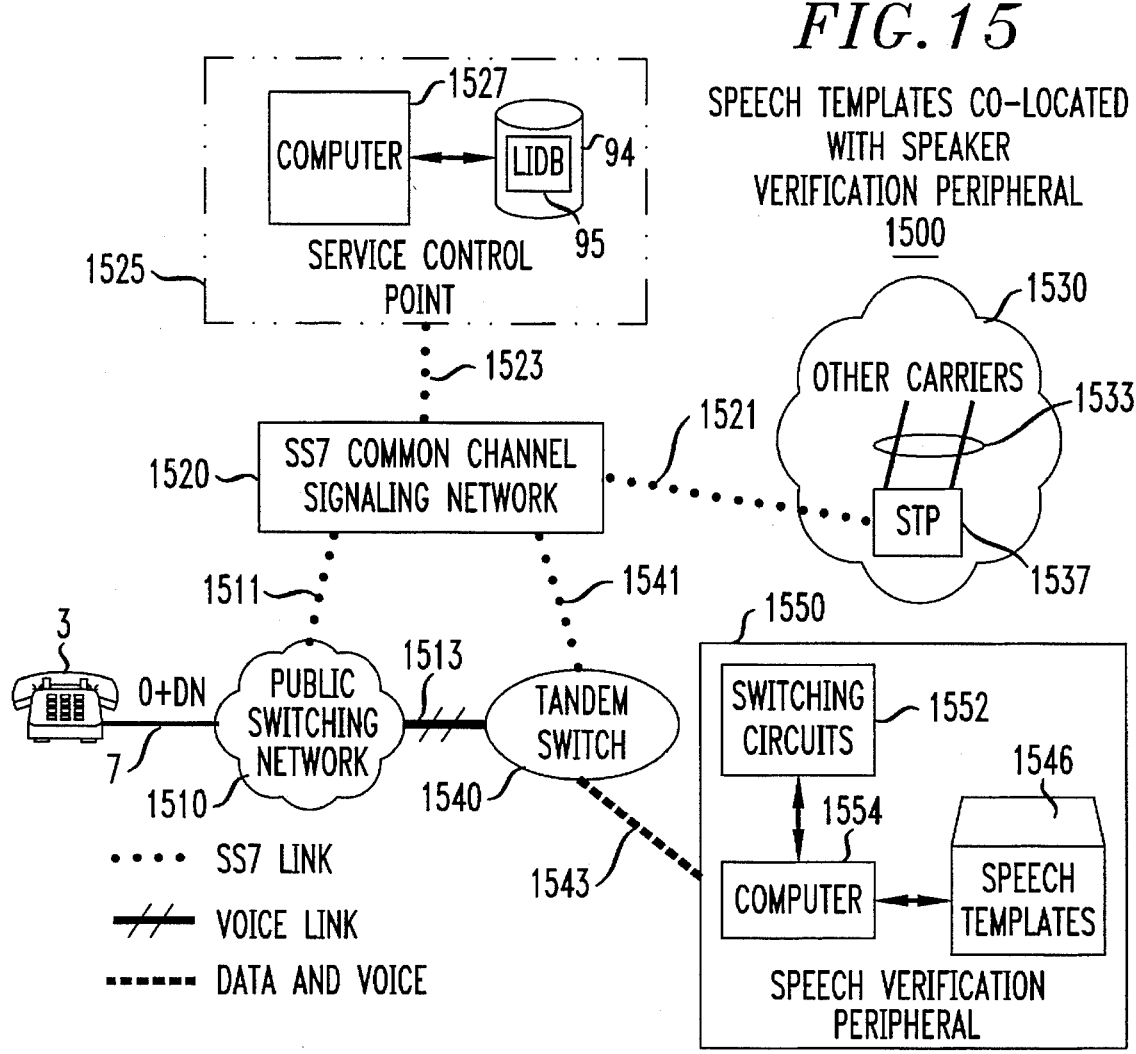
FIG. 15 depicts second network embodiment 1500 for performing voice verification for calling card calls within a signaling system 7 (SS7) network where speech templates are located within a speaker verification peripheral (SVP)
Figure 16:
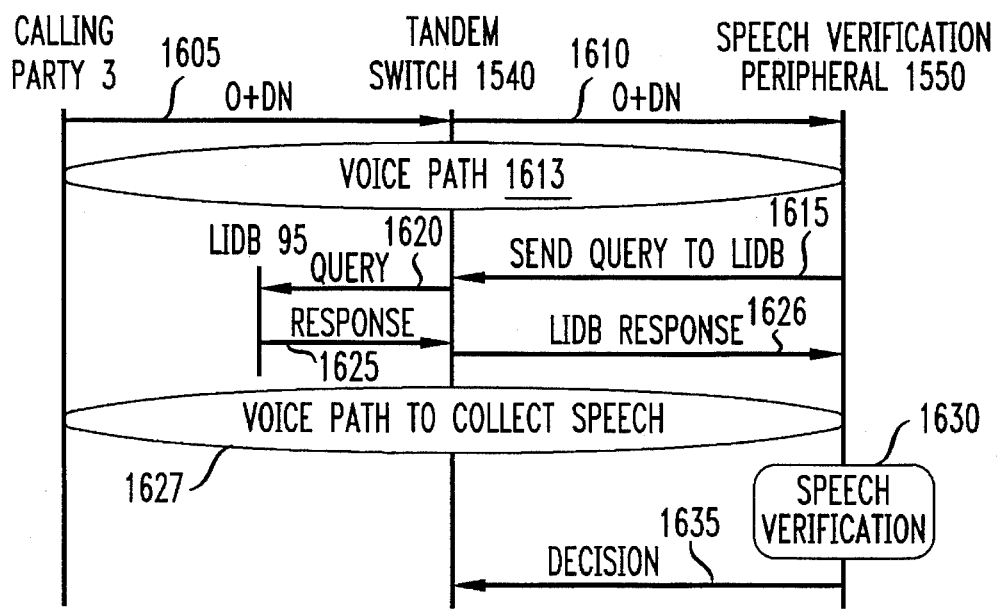
FIG. 16 depicts, at a high level, inter-unit communication that occurs, for network embodiment 1500 shown in FIG. 15 for processing a calling card call.
Figure 17:
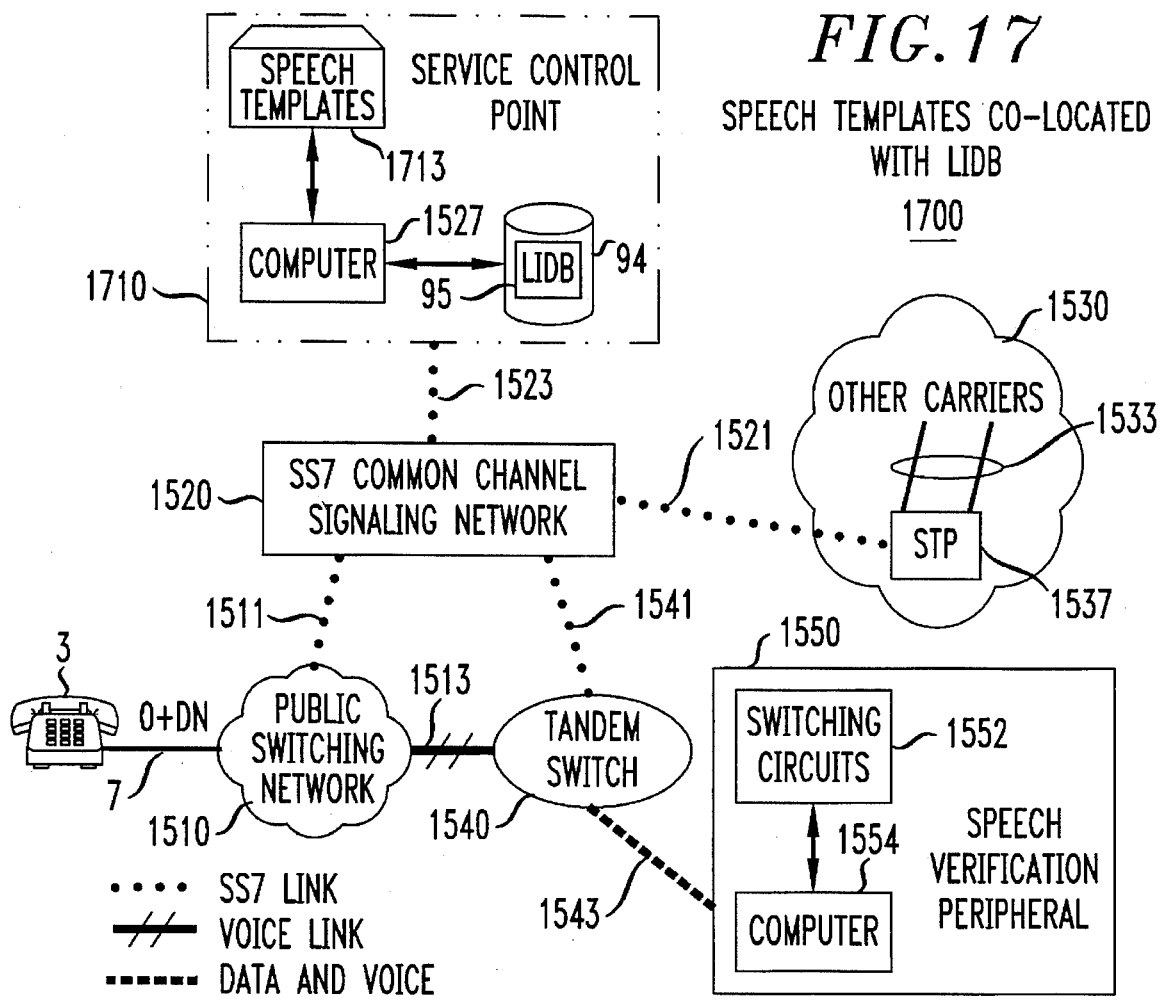
FIG. 17 depicts third network embodiment 1700 for performing voice verification for calling card calls within an SS7 network where speech templates are located within a service control point (SCP) and illustratively co-extensively with a line information database (LIDB)
Figure 18:
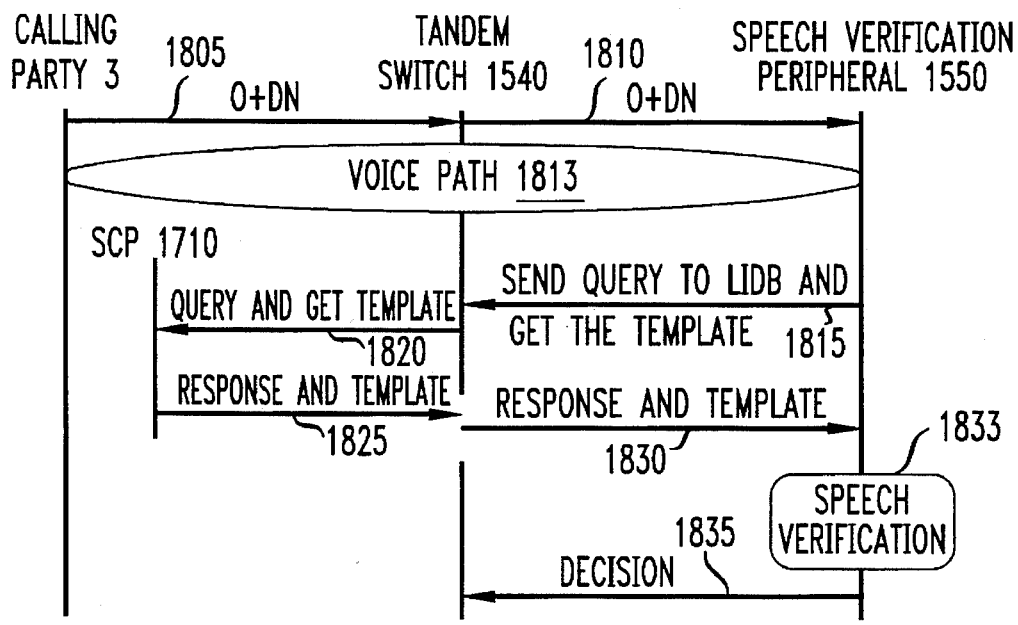
FIG. 18 depicts, at a high level, inter-unit communication that occurs, for network embodiment 1700 shown in FIG. 17 for processing a calling card call.

The three SS7 embodiments are shown in FIGS. 15, 17 and 19 with corresponding protocol diagrams of inter-unit communication therefor shown in FIGS. 16, 18 and 20, respectively. To fully understand each of these embodiments shown in FIGS. 15, 17 and 19, the reader should simultaneously refer to the corresponding protocol diagram as well. The primary differences among these embodiments are the location at which the voice (speech) templates reside, i.e. co-extensive with the LIDB or not at an SCP; and the specific signaling links through which these templates can be accessed.

FIG. 15 depicts network embodiment 1500 for performing voice verification for calling card calls within an SS7 network where speech templates are located within a speaker verification peripheral, i.e. not within an SCP. This SS7 based embodiment is the closest, in terms of providing localized voice verification, to the centralized tandem-based embodiment described above in conjunction with FIGS. 2–14.

In particular, embodiment 1500 contains public switching network 1510, tandem switch 1540 and other networks 1530, all connected through respective SS7 signaling links 1511, 1541 and 1521 to SS7 common channel signaling (CCS) network 1520. Network 1500 also contains tandem switch 1540, speech verification peripheral (SVP) 1560 and SCP 1525. CCS network 1520, which though not specifically shown is an inter-connected network of cascaded SS7 STPs, is connected through SS7 links 1523 to SCP 1525. Tandem switch 1540 is connected, through data and voice links 1543, as described in detail above, to the SVP.

SVP 1550 contains computer (and appropriate speech processing interfaces) 1554, switching circuits 1552 and database 1546 of speech templates. Switching circuits 1552 interface the computer to appropriate voice paths emanating over links 1543. The SVP locally stores speech templates and, through computer 1554, performs local comparisons of these templates to verify an identity claimed by a caller, such as caller 3.

SCP 1525 contains computer 1527 and disk storage 94 with LIDB 95 resident thereon. Carriers (service providers) 1533, that utilize external telephone networks 1530, other than the one carrier served by tandem switch 1540, can access LIDB 95, through STP 1537, SS7 link 1521 and SS7 CCS network 1520.

Operationally speaking, and as shown in FIG. 16, caller 3, in dialing a calling card call, dials into public switched network 3, via telephone line 7. This caller enters his or her destination number preceded by zero, i.e. "0+DN". This number is forwarded, as symbolized by line 1605, by network 1510 to tandem switch 1540 which serves the geographic area in which this caller is situated. The tandem, in turn, forwards this number, as symbolized by line 1610, to SVP 1550. Thereafter, the SVP, as symbolized by operation 1613, establishes a voice path through the tandem switch to the caller, plays an appropriate voice announcement to the caller prompting the caller to enter his or her calling card number and collects the number so entered. Once this number is completely obtained, the SVP, in the manner discussed above for the voice service node, fabricates a query into a LIDB at SCP 1525 to verify this calling card number and forwards, as symbolized by line 1615, that query onward, over link 1543, to the tandem switch. The query contains the calling card number among other information. The tandem switch, in turn, fabricates an SS7 query message containing the query it received from the SVP and, as symbolized by line 1620, sends the SS7 query message onward, through SS7 links 1541, SS7 CCS network 1520 and SS7 links 1523, to SCP 1525 (shown in FIG. 15 to which the reader should also be simultaneously referring). This SCP then, through computer 1527, accesses LIDB 95 situated within disk storage 94 to validate the calling card number contained in the query message. As symbolized by line 1625, SCP 1525 fabricates and forwards an appropriate SS7 response message back through SS7 links 1523, SS7 CCS network 1520 and SS7 links 1541 to tandem switch 1540. The response specifies whether the calling card number is valid or not. Tandem switch 1540 then extracts the response from the SS7 message and passes, as symbolized by line 1626, that response back to SVP 1550. If the calling card number is valid, the speech verification peripheral then establishes a voice path to the caller, as symbolized by operation 1627, to collect a voice template, typically for a pre-defined password, from the caller. Once this template is collected, SVP undertakes voice verification as symbolized by operation 1630 and using locally stored voice templates 1546. The results of this verification are forwarded onward, as symbolized by line 1635, to the tandem switch which suitably instructs network 1510 to "float the call" or not depending upon whether the verification was successful or not. Both the tandem and the SVP also then disconnect the voice path established between these components and the caller.

While LIDB 95 is shared among many different telephone networks and accessible thereto through SS7 CCS network 1520 and associated SS7 links, the speech templates, specifically templates 1546, are still stored locally within the SVP. Consequently, access to these templates is restricted to callers who originate calls within geographic service area of tandem switch 1540.

FIG. 17 depicts network embodiment 1700 for performing voice verification for calling card calls within an SS7 network but where speech templates are located within a service control point (SCP) and illustratively co-extensively with LIDB 95. Centralizing the voice templates at the SCP network 1600 not only eliminates the geographic restriction inherent in network 1500 but does so without incurring unnecessary equipment and data duplication and hence cost.

The only relevant difference between network 1500 shown in FIG. 15 and network 1700 shown in FIG. 17 is the placement of voice (speech) template database. In the former network, these templates, in the form of database 1546 is situated within SVP 1556; in the latter network, these templates, in the form of database 1713, is now located within SCP 1710. As such with network 1700, these templates are now centrally accessible to any and all networks that can connect through SS7 CCS network 1520 to this SCP, hence vastly expanding the geographic area over which caller 3 can be located and still utilize voice verification. The other relevant details of network 1700 are highly similar to those in network 1500 which have been discussed above.

Operationally speaking, and as shown in FIG. 18, caller 3, in dialing a calling card call, dials into public switched network 3, via telephone line 7. This caller enters his destination number preceded by zero, i.e. "0+DN". This number is forwarded, as symbolized by line 1805, by network 1510 to tandem switch 1540 which serves the geographic area in which this caller is situated. The tandem, in turn, forwards this number, as symbolized by line 1810, to SVP 1550. Thereafter, the SVP, as symbolized by operation 1813, establishes a voice path through the tandem switch to the caller, plays an appropriate voice announcement to the caller prompting the caller to enter his calling card number and collects the number so entered. Once this number is completely obtained, the SVP fabricates both a query into a LIDB to verify this calling card number and a message to the SCP to provide the stored template for this caller. This query and message are both forwarded, as symbolized by line 1815, via link 1543, to the tandem switch. The query contains the calling card number, among other information not relevant here. Different voice matching algorithms, depending upon the specific speech characteristics being matched, will require different corresponding forms of the same voice template. Consequently, database 1713 can store a given template in a number of different forms and supply any such specific form on request. In this manner, SCP 1710 can maintain data compatibility with the processing requirements of many different networks, each of which can utilize one of a number of different voice matching Algorithms. Accordingly, the message to the SCP requesting the template will also specify the particular form of the requested template needed by SVP 1550 and appropriate to the specific template matching algorithm used therein. The tandem switch, in turn, fabricates an appropriate SS7 message containing both the query to validate the calling card number and a request for a desired form of the stored voice template associated with this number and, as symbolized by line 1820, forwards this SS7 message onward, through SS7 links 1541, SS7 CCS network 1520 and SS7 links 1523, to SCP 1525 (shown in FIG. 17 to which the reader should also be simultaneously referring) to SCP 1710. In response to this message, SCP 1710 performs an access into LIDB 95 to validate the calling card number as well as access and read the desired form of the requested voice template from database 1713. The SCP then fabricates an appropriate SS7 response message containing the query response and the read template and forwards, as symbolized by line 1825, this message back to the tandem switch, via through SS7 links 1523, SS7 CCS network 1520 and SS7 links 1541. Tandem switch 1540 then extracts the query response and the read template from the SS7 message and passes, as symbolized by line 1830, this information back to SVP 1550. If the calling card number is valid, the speech verification peripheral then establishes a voice path to the caller (the operation not specifically shown) to collect a voice template, typically for a pre-defined password, from the caller. Once this template is collected, SVP undertakes voice verification, as symbolized by operation 1833, by determining whether the template it has just collected suitably matches the template just supplied by SCP 1710. The results of this verification are forwarded onward, as symbolized by line 1835, to the tandem switch which suitably instructs network 1510 to "float the call" or not depending upon whether the verification was successful or not. Both the tandem and the SVP also then disconnect the voice path established between these components and the caller.

Rather than forming a single SS7 message containing both the calling card query and a request for a stored template (in a specific form), separate SS7 messages can be sent by the tandem switch to the SCP. For example, the first message could be a query requesting a LIDB check of the calling card number. If the result indicated that the number is valid, then, the tandem switch, upon receipt of an appropriate SS7 response message, could fabricate and send another SS7 message to the SCP requesting the desired form of the stored template. The SCP would then read this template, in the form desired, from database 1713 and provide the associated data via an appropriate SS7 message to the tandem switch. Furthermore, rather than provide a separate response to the query indicating that the calling card number is valid, the response message could contain the requested template. Responding in this fashion would eliminate the need for an additional set of SS7 messages between the tandem switch and the SCP.

In network 1700, voice verification subscribers would be enrolled through SVP 1550 which, in turn, would send the raw voice template through tandem switch 1540 and SS7 CCS network to SCP 1710. This SCP, in turn, would convert this template into a variety of different forms and store the raw template and all of these forms, within speech template database 1713, for subsequent access by this SVP 1550 or any of those associated with and contained within external networks 1530.

FIG. 19 depicts network embodiment 1900 for performing voice verification for calling card calls within an SS7 network where speech templates are located within an SCP and illustratively co-extensively with a LIDB and where the SCP has a SS7 link to the SVP. Network 1900 possesses the advantage, over network 1700 shown in FIG. 17, that the SVP can now communicate with any SCP, accessible through SS7 CCS network 1530, while by-passing the tandem switch, thereby reducing the call processing load on this switch and decreasing call processing time.

Various relevant differences exist between networks 1700 and 1900 shown in FIGS. 17 and 19: (a) in network 1700, SVP 1550 is connected only to tandem switch 1540 and must, of necessity, access the SS7 CCS network and SCP through this switch; while in network 1900, SVP 1550 is connected through SS7 link 1907 directly to the SS7 CCS network; (b) in network 1700, SVP 1550 is connected by both voice and data links 1543 to tandem switch 1540; while in network 1900 only a voice link is required for this connection (a corresponding data link can be implemented as well, if needed); and (c) in network 1700, speech template database 1713 may be situated only at SCP 1710; while in network 1900, speech template databases, i.e. databases 1713 and 1909, are respectively situated at both the SCP and the SVP. With network 1900, voice templates for locally situated callers can be stored at each corresponding SVP to reduce the size of the voice template database at the SCP. However and importantly, by virtue of direct SS7 connection 1907 between SVP 1550 and SCP 1710, voice templates, as the need arises, can also be advantageously copied to and stored within this SCP or communicated, through the SS7 CCS network to other SVPs or SCPs, for storage and subsequent use thereat. The other relevant details of network 1900 are highly similar to those in networks 1500 and 1700 which have been discussed above.

Operationally speaking, and as shown in FIG. 20, caller 3, in dialing a calling card call, dials into public switched network 3, via telephone line 7. This caller enters his destination number preceded by zero, i.e. "0+DN". This number is forwarded, as symbolized by line 2005, by network 1510 to tandem switch 1540 which serves the geographic area in which this caller is situated. The tandem, in turn, forwards this number, as symbolized by line 2010, to SVP 1550. Thereafter, the SVP, as symbolized by operation 2015, establishes a voice path through the tandem switch to the caller, plays an appropriate voice announcement to the caller prompting the caller to enter his calling card number and collects the number so entered. Once this number is completely obtained, the SVP, determines whether the voice template for this caller is locally stored within template database 1909. If this template is not so stored, then the SVP fabricates both an SS7 query into LIDB 95 at SCP 1710 to verify this calling card number and a SS7 message to this SCP to provide the stored template for this caller. This query and message are both forwarded, as symbolized by line 2020, directly via SS7 link 1907, to SS7 CCS network 1520 and, from there, to SCP 1710 (shown in FIG. 19 to which the reader should also be simultaneously referring). In response to this message, SCP 1710 performs an access into LIDB 95 to validate the calling card number as well as access and read the desired form of the requested voice template from database 1713. The SCP then fabricates an appropriate SS7 response message containing the query response and the read template and forwards, as symbolized by line 2025, this message back to SVP 1550, via SS7 links 1523, SS7 CCS network 1520 and SS7 links 1907. Alternatively, if the needed voice template is locally stored within database 1552, then the SVP merely requests validation of the calling card number through LIDB 95.

If the calling card number is valid, SVP 1550 then establishes a voice path to the caller (the operation not specifically shown) to collect a voice template, typically for a pre-defined password, from the caller. Once this template is collected, SVP undertakes voice verification, as symbolized by operation 2030, by determining whether the template it has just collected suitably matches the template just supplied either by SCP 1710 or through local database 1909. The results of this verification are forwarded onward, as symbolized by line 2035, to the tandem switch which suitably instructs network 1510 to "float the call" or not depending upon whether the verification was successful or not. Both the tandem and the SVP also then disconnect the voice path established between these components and the caller.

In contrast to that discussed above in conjunction with network 1700 shown in FIG. 17, voice verification subscribers, in network 1900, would be enrolled through SVP 1550 but the SVP itself would locally store the raw voice template within database 1909, convert that template into the form required by that SVP and store that particular form also within database 1909. This SVP would only copy this template, typically in its raw form, to either SCP 1710 or another SCP, the latter situated in networks 1530, in response to a request therefrom. The recipient SCP (or ultimately SVP) would then convert the raw template it received from SVP 1550 into a form the recipient required to perform template matching. Here, too, depending upon the amount of information residing in the local databases 1909 for any given caller handled by tandem 1540, SVP 1550 can send one or more SS7 messages to an appropriate SCP to obtain the needed LIDB validation and voice template data.

Clearly, one skilled in the art can now readily appreciate that voice template matching could be used in a wide variety of different ways to control access to certain telephonic services. Furthermore, those skilled in the art will quickly realize that voice template matching, implemented through the telephone network and in accordance with our inventive teachings, could also be used to control access to a wide range of non-telephonic services, such as access to a physical facility. In this case, an admitting mechanism, whether a door opening device or other suitable access control device, would need to be interfaced, presumably through a suitable modem and either a computer system or dedicated circuitry, to the telephone network. This device, as interfaced, would then accept suitable commands from the network, that indicate that access should be granted or denied as a result of an attempted voice verification of the person seeking access, and operate accordingly.

Although we have shown and described in detail various embodiments which incorporate the teachings of our present invention, those skilled in the art can readily devise many other varied embodiments that still incorporate our inventive teachings.

We claim:

1. In a public switched telephone network, apparatus for selectively extending a call through the network from a caller placing the call via an access facility connected to the network, to a destination number, said apparatus comprising:

a switching network connected to the caller and the destination number by the public switched telephone network, responsive to an instruction, for selectively routing a call therethrough so as to connect a caller to a destination number;

an indicia validator, connected to said switching network, for determining, in response to a first message containing a query to a line information database (LIDB), whether a pre-defined indicia for said caller signifies that said call should be routed through said switching network means and, in response thereto, generating a second message responsive to said query, said indicia validator having a common channel signaling network and a service control point, said common channel signaling network being connected to said service control point and to both said switching network and a voice processor, said service control point including:
a database;
means for storing said database; and
a database processor, connected to said storing means and to said common channel signaling network, for interrogating said database in response to said first message and, in response to a result of said interrogation, generating said second message, the contents of said second message being determined by an indication stored within said database and associated with an indicia contained within said first message; and said voice processor, connected to said switching network and to said indicia validator, for obtaining said indicia from said caller and, in response thereto, producing said first message containing the indicia and, in response to said second message, generating said instruction to said switching network; said voice processor comprising:
a tandem switch connected to said switching network and to said common channel signaling network;
a voice service node for verbally communicating with a caller and obtaining voice responses therefrom so as to extract said indicia from said caller;
a voice verifier, connected in series, both in a voice path and a data path, between said tandem switch and said voice service node, for verifying the voice of said caller before the call is completed; and
wherein in said voice processor:
said voice service node generates, in response to said indicia, said first message and passes said first message through said voice verifier to said tandem switch for subsequent application to said common channel signaling network;
said tandem switch receives said second message from said common channel signaling network;
said voice verifier intercepts all call processing messages flowing between said tandem switch and said voice service node and holds said second message from the tandem switch until said voice verifier has completed a successful voice verification of the caller; and
said voice verifier passes said second message onward to said voice service node to generate said instruction, said instruction subsequently being passed through said voice verifier to said tandem switch and onward thereby to said switching network.

2. The apparatus in claim 1 wherein said indicia is a calling card number and said indicia validator means comprises a database having a plurality of calling card numbers and a corresponding indication of the validity of each of said numbers.

3. The apparatus in claim 1 wherein said voice verifier comprises:

a voice verification system for verifying the voice of the caller;

a computer controlled switch, connected to said voice service node and to said tandem switch, for selectively connecting and disconnecting a voice connection, through said tandem switch, between said voice service node and said caller, and for selectively connecting and disconnecting a voice path, through said tandem switch, between said voice verification system and the caller; and an application processor, connected to and for controlling both said voice verification system and said computer controlled switch and, connected to said voice service node and said tandem switch, for intercepting call processing messages occurring therebetween and holding said second message from the tandem switch until successful voice verification of the caller is complete.

4. The apparatus in claim 3 wherein said voice verification system, during a pre-defined enrollment procedure, obtains and stores an initial voice template for a subscriber, and, during a voice verification procedure, obtains a subsequent voice template from a caller claiming to be the subscriber and compares the subsequent voice template against the initial voice template to determine whether a match exists therebetween so as to verify the identity of the caller to be that of the subscriber.

5. The apparatus in claim 4 wherein said predefined indicia is a password.

6. The apparatus in claim 4 wherein said initial and subsequent voice templates are compared using Hidden Markov Modeling or Dynamic Time Warping.

7. The apparatus in claim 3 wherein said voice verifier comprises means, operative in response to the second message and if the voice verification system has not successfully verified the voice of the caller to be a corresponding subscriber, for changing said second message from a passed LIDB response message to a failed LIDB response message so as to form a changed message and forwarding said changed message, as said second message, to said voice service node so as to prevent said call from being routed through said switching network.

* * * * *